United States Patent

Tamaki et al.

[11] Patent Number: 5,928,418
[45] Date of Patent: Jul. 27, 1999

[54] ASPHALT EMULSION

[75] Inventors: Ryoichi Tamaki; Katsuhiko Asamori; Hirotaka Sasaki; Hitoshi Funada; Takao Taniguchi, all of Wakayama, Japan

[73] Assignee: Kao Corporation, Tokyo, Japan

[21] Appl. No.: 08/875,732

[22] PCT Filed: Nov. 7, 1996

[86] PCT No.: PCT/JP96/03256

§ 371 Date: Aug. 4, 1997

§ 102(e) Date: Aug. 4, 1997

[87] PCT Pub. No.: WO97/20891

PCT Pub. Date: Jun. 12, 1997

[30] Foreign Application Priority Data

Dec. 4, 1995 [JP] Japan .................................. 7-315497
May 13, 1996 [JP] Japan .................................. 8-117425

[51] Int. Cl.$^6$ .......................... C09D 195/00; C09D 7/02
[52] U.S. Cl. ............................................ 106/277; 106/316
[58] Field of Search ..................................... 106/277, 316

[56] References Cited

U.S. PATENT DOCUMENTS 5,650,000  7/1997  Shuey et al. ............................ 106/277

FOREIGN PATENT DOCUMENTS

| A57-42763 | 3/1982 | Japan . |
| 363017960 | 1/1988 | Japan .............................. C08L 95/00 |
| A63-17960 | 1/1988 | Japan . |
| A7-118538 | 5/1995 | Japan . |
| 409147531 | 6/1997 | Japan .............................. C08L 95/00 |
| 409194736 | 7/1997 | Japan .............................. C08L 95/00 |

*Primary Examiner*—David Brunsman
*Attorney, Agent, or Firm*—Birch, Stewart, Kolasch & Birch, LLP

[57] ABSTRACT

An asphalt emulsion comprising water, asphalt, (A) an emulsifier selected from the group consisting of specific aliphatic amines, aminated lignins, imidazolines having a hydrocarbon group having 7 or more carbon atoms, and amidobetaines having a hydrocarbon group having 7 or more carbon atoms, (B) a polyphenolic compound, and (C) at least one member selected from the group consisting of anionic polumeric dispersants, hydroxycarboxylic acids and/or (D) at least one member selected from the group consisting of saccharides, sugar alcohols and polyhydric alcohols, which is excellent in storage stanility, mixability with aggregate and low foaming properties of the emulsion itself, in adherence of the products of breaking thereof to aggregate, and in stripping resistance of the construction executed by the use of the emulsion.

37 Claims, No Drawings

ASPHALT EMULSION

BACKGROUND ART

1. Technical Field

The present invention relates to an additive composition for asphalt emulsion, a composition for asphalt emulsion and a composition for emulsification which are used for the preparation of an asphalt emulsion; an oil-in-water asphalt emulsion; a paving composition comprising aggregate and an oil-in-water asphalt emulsion; and a process for the preparation of the above composition for emulsification. The asphalt emulsion according to the present invention is excellent in stability as emulsion and mixability with aggregate, and is easy to control the decomposition time thereof, and the products (mainly asphalt) of breaking of the emulsion are excellent in adherence to aggregate. Further, the constructions executed by the use of the emulsion are excellent in stripping resistance. Other asphalt emulsions according to the present invention are used by mixing it with aggregate in plant or place in the use of open grade mixtures, dense grade mixtures, slurry seals, sand mixtures, reclaimed mixtures and so on, are excellent in stability as emulsion, mixability with aggregate and mixability with cement, and is easy to control the decomposition time thereof, and the products (mainly asphalt) of breaking of the emulsions are excellent in adherence to crushed stone. Further, the constructions, such as pavement, executed by the use of the emulsions are excellent in strength, endurance and stripping resistance.

2. Description of the Related Art

Bituminous materials obtained from petroleum, e.g., asphalt, tar and pitch, have widely been used from old as a paving material, a waterproof material and an adhesive and in the construction of railroads. However, bituminous materials are very poor in workability when used as such, owing to their extremely high adhesivenesses. Therefore, bituminous materials are used after their flowabilities are enhanced by a means such as heating (i.e., heat melting process), treatment to be in the form of emulsion by using a proper emulsifying agent and water, and dissolution in a suitable solvent, for securing a desirable workability Among such emulsions of bituminous materials, aqueous emulsions of asphalt are generally called "asphalt emulsions". Such the asphalt emulsions are roughly classified into fast-decomposing emulsions (i.e., emulsions for application) which are directly applied to the object surface, and slow-decomposing ones (i.e., emulsions for blending) which are blended with aggregate. Although the surfactant to be used in the preparation of an asphalt emulsion is suitably selected from among anionic surfactants, cationic surfactants, nonionic surfactants and amphoteric surfactants, the kind thereof is generally determined depending upon the process of execution thereof.

Among the above asphalt emulsions, one for blending is mixed with aggregate, a filler and other components. The asphalt composition thus prepared is used for the construction of paving of a road. The so-called emulsion breaking is caused by the evaporation and elimination of aqueous components in the composition, after the execution of a road by using an asphalt composition. Thus, the asphalt is hardened to complete the construction of paving of a road.

Further, the kind of paving of a road to be formed and the properties and performance thereof vary depending upon the kind of aggregate to be used together with such the emulsion for blending. For example, an asphalt composition (an open grade mixture) comprising an emulsion for blending and an open grade aggregate is used in the execution of upper and lower subbases, or in the execution of surface drainage course. While an asphalt composition (a dense grade mixture) comprising an emulsion for blending and a dense grade aggregates is used in the execution of upper subbase or surface course. Further, a composition prepared by mixing an emulsion for blending with a fine aggregate or filler is used as slurry seal for the purpose of restoring a deteriorated area of pavement, and a composition (a sand mixture) prepared by mixing it with sand is used for forming a simple surface course. It is also conducted to mix an emulsion for blending with crushed paving (a reclaimed mixture), for the re-use of deteriorated and existing paving. Meanwhile, the mixing processes for preparing such the asphalt compositions include two processes, i.e., in-plant mixing and in-place mixing, and they are used properly and suitably depending upon the conditions.

In the execution of a road by using an asphalt emulsion for blending, the asphalt which is re-generated by breaking the asphalt emulsion adheres to aggregate to act as a binder among the aggregate, by which the strength and endurance of paving of a road are exhibited. Meanwhile, as described above, an asphalt emulsion for blending contains a surfactant. An emulsion containing, among surfactants, an anionic surfactant or a nonionic surfactant has a significant disadvantage in that the products, mainly asphalt, of breaking of the emulsion are poor in adherence to aggregate, though the emulsion has such an advantage that it exhibits good mixability with aggregate. On the other hand, a cationic surfactant accelerates the adhesion of asphalt particles to aggregate by the electric attractive force thereof. However, paving of a road executed by the use of an asphalt emulsion containing a cationic surfactant is also poor in strength and endurance. Thus, it has become a common opinion that every paving of a road executed by the use of an asphalt emulsion is poor in strength and endurance. Although the strength and endurance of paving of a road executed by the use of an asphalt emulsion are, as described above, exhibited by the adhesion of asphalt to aggregate, the strength and endurance of paving of a road exhibited by the use of a current asphalt emulsion are insufficient, and measures for improvement by which higher strength and endurance can be realized are desired.

Additionally, it is required for an asphalt emulsion for blending to have such performances that the stability of the emulsion is excellent when a forced mechanical agitation is conducted, that it does not cause separation (i.e., an emulsion breaking is not occurred) during execution such as transportation, spreading and rolling, that it is separated (i.e., the emulsion is broken) at a somewhat high speed after paving, that the products of breaking of the emulsion is excellent in adherence to aggregate, and that these various properties are not affected by the kind of aggregate, atmospheric temperature at execution and so on. As measures for satisfying these requirements, there have been proposed the use of a large amount of an emulsifier (surfactant), the use of many kinds of emulsifiers, and the addition of a water-soluble organic polymer, e.g., polyvinyl alcohol, gelatin, methylcellulose, polyacrylamide or guar gum, to an asphalt emulsion as a protective colloid. An asphalt emulsion is stabilized by carrying out such measures. However, by carrying out these measures, such the effect that the adherence of the products, mainly comprising asphalt, of breaking of the emulsion to aggregate is essentially improved by the improvement of the properties of interface between aggregate and asphalt, is attained.

Various methods for improving the various properties of an asphalt emulsion have been proposed in addition to the those described above.

For example, there have been proposed the use of an aminated lignin, an alkylimidazoline compound and a nonionic emulsifier (see U.S. Pat. No. 3,871,893), that of a fatty acid salt of an alkylimidazoline compound (see U.S. Pat. No. 3,979,323), and that of a specific nonionic emulsifier (see Japanese Patent Publication-A No. Hei 7-118538) for improving the mixability of an asphalt emulsion with aggregate and the adherence properties of the products of breaking of the emulsion to aggregate. By these techniques, the mixability of an asphalt emulsion with aggregate is improved. Even when such an asphalt emulsion is used, however, the adherence of asphalt to aggregate and the stripping resistance of paving executed are insufficient owing to the intervention of water. Thus, the paving does not exhibit sufficient strength and endurance, only by measures of selecting the surfactant. Further, Japanese Patent Publication-A No. Sho 57-42763 and U.S. Pat. No. 3,867,162 disclose the use of a saturated fatty acid and that of tall oil fatty acid, respectively. However, an asphalt emulsion containing such an organic acid cannot be used in the case wherein cement or ferrous slag, which is basic, is used. Additionally, it cannot be expected under the current circumstances wherein lowering in the quality of road asphalt or aggregate is apprehended and, on the other hand, the use of reclaimed materials also spreads that excellent mixability of the emulsion with aggregate and firm adhesion of the components, such as asphalt, in the products of breaking of the emulsion to aggregate are exhibited by the use of an asphalt emulsion containing such an organic acid.

It is described in Japanese Patent Publication-A No. Sho 63-17960 that by allowing an asphalt emulsion to contain tannic acid or a tannin compound, the mixability of the emulsion with aggregate, the adherence of, e.g., asphalt to aggregate, and the stripping resistance of the paving which has been executed with the use of the emulsion are improved, and the decomposition time of the emulsion is prolonged. In an asphalt emulsion containing tallow-alkyl propylene-diamine, polyoxyethylene tallow-alkyl propylenediamine or stearyltrimethylammonium chloride which is a cationic surfactant, which is described in the above Publication, the delay of the decomposition time thereof is certainly attained by the addition of tannic acid. However, even in such the case, the decomposition time is still too short for the use of the asphalt emulsion as one for blending. Further, when tannic acid or a tannin compound is to be contained in an asphalt emulsion containing a nonionic surfactant such as polyoxyethylene nonylphneyl ether or an anionic surfactant such as sodium oleate, the adherence of the components such as asphalt in the products of breaking of the emulsion to aggregate is remarkably lowered, and thus the sufficient strength and endurance of a paving can not be obtained, though the mixability of the emulsion with aggregate is improved.

As described above, there has not been known an asphalt emulsion which is one to be used for the preparation of a composition (for example, an open-grade mixture, a dense grade mixture, a slurry seal, a sand mixture or a reclaimed mixture) for paving a road comprising an asphalt emulsion for blending and aggregate and which satisfies all of the properties including stability as emulsion, mixability with aggregate, easiness of controlling the decomposition time, adherence of the products of breaking thereof to crushed stone, and stripping resistance, strength and endurance of the paving executed by the use of the emulsion, the development thereof has been eagerly desired and the development thereof has been highly expected.

DISCLOSURE OF THE INVENTION

Summary of the Invention

The present inventors have extensively studied to solve the above problems according to the asphalt emulsion. As a result of the studies, the present inventors have found that by adding a polyphenolic compound which not only acts as a protective colloid for the asphalt particles in an asphalt emulsion but also exhibits adherent affinity for aggregate, and a dispersant for inorganic materials such as clay, powdered stone and cement and/or a water-holding component to an aqueous emulsifier solution which is used for the emulsification of asphalt, the synergism between them is exhibited, and the emulsion stability, mixability with aggregate and mixability with cement of the asphalt emulsion, the adherence of the products, such as asphalt, of breaking of the emulsion to aggregate, and the stripping resistance and strength of the paving executed with the use of the emulsion are remarkably improved. The present invention has been accomplished on the basis of this finding.

Thus, the first embodiment of the present invention relates to an additive composition for asphalt emulsion which comprises (B) a polyphenolic compound, at least one member selected from the group consisting of (C) anionic polymeric dispersants, hydroxycarboxylic acids and water-soluble salts of hydroxycarboxylic acids and (D) saccharides, sugar alcohols and polyhydric alcohols and, optionally, (A) an emulsifier.

Further, the second embodiment of the present invention relates to an asphalt emulsion comprising asphalt, water, (A) an emulsifier, (B) a polyphenolic compound and at least one member selected from the group consisting of (C) anionic polymeric dispersants, hydroxycarboxylic acids and water-soluble salts of hydroxycarboxylic acids and (D) saccharides, sugar alcohols and polyhydric alcohols.

The asphalt emulsion of the second embodiment of the present invention includes an asphalt emulsion characterized by containing (A) an emulsifier, (B) a polyphenolic compound and one or more compound selected from among (C) anionic polymeric dispersants, or hydroxycarboxylic acids or water-soluble salts thereof, and/or (D) saccharides, sugar alcohols and polyhydric alcohols, as essential components.

Furthermore, the third embodiment of the present invention relates to a paving composition which is used for, e.g., paving a road, comprising aggregate and the asphalt emulsion of the second embodiment of the present invention.

The fourth embodiment of the present invention relates to use of the additive composition for asphalt emulsion according to the first embodiment for preparing an asphalt emulsion.

The fifth embodiment of the present invention relates to a composition for emulsification which comprises water, (A) an emulsifier, (B) a polyphenolic compound, and at least one member selected from the group consisting of (C) anionic polymeric dispersants, hydroxycarboxylic acids and water-soluble salts of hydroxycarboxylic acids and (D) saccharides, sugar alcohols and polyhydric alcohols.

The composition for emulsification of the fifth embodiment of the present invention may further contain a monobasic acid.

The sixth embodiment of the present invention relates to a process for the preparation of the composition for emulsification of the fifth embodiment of the present invention containing components (C) and (D), which comprises step 1 of adding a mixture of component (A) and component (D) to an aqueous solution of component (B) to prepare an aqueous solution and step 2 of adding an aqueous solution of component (C) to the obtained solution.

The seventh embodiment of the present invention relates to a process for the preparation of the composition for emulsification of the fifth embodiment of the present invention containing components (C) and (D) and a monobasic acid, which comprises step 1 of adding a monobasic acid to an aqueous solution of component (B) to prepare an aqueous acidic solution, step 2 of adding a mixture of component (A) and component (D) to the aqueous acidic solution to prepare an aqueous solution, and step 3 of adding an aqueous solution of component (C) to the obtained aqueous solution.

The eighth embodiment of the present invention relates to a process for emulsifying asphalt in water, which comprises adding molten asphalt to the composition for emulsification of the fifth embodiment of the present invention to prepare a mixture, and then emulsifying the mixture.

The ninth embodiment of the present invention relates to use of the composition for emulsification of the fifth embodiment of the present invention for emulsifying asphalt.

Further, the present inventors have made extensive studies also on an asphalt emulsion which is applicable to the case where particularly high strength and endurance are necessitated in a paving executed with the use of the emulsion. As a result of the studies, the present inventors have found that by adding (A) at least one surfactant selected from the group consisting of specific aliphatic amines, aminated lignins, imidazolines having a hydrocarbon group having 7 or more, preferably 8 or more, carbon atoms, betaines having a hydrocarbon group having 7 or more, preferably 8 or more, carbon atoms and amidobetaines having a hydrocarbon group having 7 or more, preferably 8 or more, carbon atoms, (B) a polyphenolic compound and, optionally, at least one member selected from the group consisting of (C) anionic polymeric dispersants, hydroxycarboxylic acids and water-soluble salts of hydroxycarboxylic acids and (D) saccharides, sugar alcohols and polyhydric alcohols in the preparation of an asphalt emulsion, the emulsion stability, mixability with aggregate and mixability with cement of the asphalt emulsion, and the easiness of controlling the decomposition time are improved, the adherence of the components, such as asphalt, in the products of breaking of the emulsion to crushed stone is also improved, and the stripping resistance, strength and endurance of the paving executed with the use of the emulsion is enhanced. The present invention has been accomplished on the basis of this finding.

A tenth embodiment of the present invention relates to a composition for asphalt emulsion which comprises (A-1) at least one member selected from the group consisting of aliphatic amines represented by the following formula (1), aminated lignins, imidazolines having a hydrocarbon group having 7 or more, preferably 8 or more, carbon atoms, betaines having a hydrocarbon group having 7 or more, preferably 8 or more, carbon atoms and amidobetaines having a hydrocarbon group having 7 or more, preferably 8 or more, carbon atoms, and (B) a polyphenolic compound:

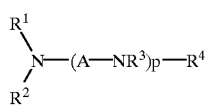
(1)

wherein $R^1$ is a hydrocarbon group or acyl group having 8 to 22 carbon atoms; $R^2$ is a hydrocarbon group having 8 to 22 carbon atoms, a hydrogen atom or a group represented by the formula: $(AO)_m$—H [wherein AO represents an oxyalkylene group having 2 or 3 carbon atoms; and m represents a number of 1 to 30]; $R^3$ is a hydrogen atom or a group represented by the formula: $(AO)_m$—H [wherein AO and m are those as the above definitions]; $R^4$ is a hydrogen atom or a group represented by the formula: $(AO)_m$—H [wherein AO and m are those as the above definitions]; A is an ethylene group or a propylene group; and p is an integer of 2 to 5.

The composition for asphalt emulsion of the tenth embodiment of the present invention may further contain (C) at least one member selected from the group consisting of anionic polymeric dispersants, hydroxycarboxylic acids and water-soluble salts of hydroxycarboxylic acids, and/or, (D) at least one member selected from the group consisting of saccharides, sugar alcohols and polyhydric alcohols.

Further, the eleventh embodiment of the present invention relates to an asphalt emulsion comprising asphalt, water and the composition for asphalt emulsion of the tenth embodiment of the present invention.

The asphalt emulsion of the eleventh embodiment of the present invention includes an asphalt emulsion characterized by containing 0.01 to 10.0 parts by weight of (A) one or more surfactant selected from among aliphatic amines represented by the following formula (1'), aminated lignins, imidazolines having a hydrocarbon group having 8 or more carbon atoms, betaines having a hydrocarbon group having 8 or more carbon atoms and amidobetaines having a hydrocarbon group having 8 or more carbon atoms and 0.01 to 5.0 parts by weight of (B) a polyphenolic compound, per 100 parts by weight of the total of 40 to 80 parts by weight of asphalt and 60 to 20 parts by weight of water:

(wherein $R^1$: represents a hydrocarbon group or acyl group having 8 to 22 carbon atoms, $R^2$: represents a hydrocarbon group having 8 to 22 carbon atoms or $R^3$, $R^3$, $R^4$: represents H or $(AO)_m$, AO: represents an oxyalkylene group having 2 to 3 carbon atoms, m: represents a number of 1 to 30, A: represents an ethylene group or a propylene group, p: represents a number of 2 to 5).

Furthermore, the twelfth embodiment of the present invention relates to a paving composition which is used for, e.g., paving a road, comprising aggregate and the asphalt emulsion of the eleventh embodiment of the present invention, wherein the amount of the aggregate is 75 to 95 parts by weight and the amount of the asphalt emulsion is 25 to 5 parts by weight per 100 parts by weight of the total of the aggregate and the asphalt emulsion.

The thirteenth embodiment of the present invention relates to use of the composition for asphalt emulsion of the tenth embodiment of the present invention for preparing an asphalt emulsion.

The fourteenth embodiment of the present invention relates to a composition for emulsification which comprises water, (A-1) at least one member selected from the group consisting of aliphatic amines represented by the above formula (1), aminated lignins, imidazolines having a hydrocarbon group having 7 or more, preferably 8 or more, carbon atoms, betaines having a hydrocarbon group having 7 or more, preferably 8 or more, carbon atoms and amidobetaines having a hydrocarbon group having 7 or more, preferably 8 or more, carbon atoms, and (B) a polyphenolic compound.

The composition for emulsification of the fourteenth embodiment of the present invention may further contain the above components (C) and (D).

The fifteenth embodiment of the present invention relates to a process for the preparation of the composition for emulsification of the fourteenth embodiment of the present invention containing components (C) and (D), which comprises step 1 of adding a mixture of component (A-1) and component (D) to an aqueous solution of component (B) to prepare an aqueous solution, and step 2 of adding an aqueous solution of component (C) to the obtained aqueous solution.

The sixteenth embodiment of the present invention relates to a process for the preparation of the composition for emulsification of the fourteenth embodiment of the present invention containing components (C) and (D) and a monobasic acid, which comprises step 1 of adding a monobasic acid to an aqueous solution of component (B) to prepare an aqueous acidic solution, step 2 of adding a mixture of component (A-1) and component (D) to the aqueous acidic solution to prepare an aqueous solution, and step 3 of adding an aqueous solution of component (C) to the obtained aqueous solution.

The seventeenth embodiment of the present invention relates to a process for emulsifying asphalt in water, which comprises adding molten asphalt to the composition for emulsification of the fourteenth embodiment of the present invention to prepare a mixture and then emulsifying the mixture.

The eighteenth embodiment of the present invention relates to use of the composition for emulsification of the fourteenth embodiment of the present invention for emulsifying asphalt.

Further, the scope and application of the present invention will be clarified from the following Detailed Description and Examples. However, it should be understood that the Detailed Description and Examples, which show preferred embodiments of the present invention, are given only for explanation, because various alternations and modifications within the attempt and scope of the present invention will be apparent to any person skilled in the art from this Detailed Description.

DETAILED DESCRIPTION OF THE INVENTION

Component (A) in the present invention may be any of cationic, nonionic, anionic and amphoteric surfactants. As the emulsifier (A), only one may be used, or it may be a multicomponent system comprising two or more members. For the preparation of an asphalt emulsion for blending, it is preferable to use at least one member selected from the group consisting of cationic and amphoteric surfactants.

Examples of the anionic surfactants to be used in the present invention include the following ones having one or two hydrophilic groups in the molecule:

(a) sulfate esters of alcohols having 4 to 18 carbon atoms, and salts thereof, (b) alkane-, alkene- and alkylaryl-, which have 4 to 18 carbon atoms, sulfonic acids, and salts thereof, (c) sulfates and phosphate esters of alkylene oxide adducts of compounds having at least one active hydrogen in the molecule, and salts thereof, (d) esters of alcohols having 4 to 22 carbon atoms with sulfosuccinic acid, and salts thereof, (e) alkyl($C_8$–$C_{18}$)diphenyl ether disulfonic acids, and salts thereof, (f) rosin acids (resin acids) and salts thereof, and tall oil mixed acids which are mixed acids of rosin acids with higher fatty acids, and salts thereof, (g) alkane- and alkene-, which have 4 to 18 carbon atoms, fatty acids, and salts thereof, and (h) salts of $\alpha$-sulfofatty acid esters.

Examples of the cationic surfactants include alkylamine salts, alkanolamines, quaternary ammonium salts, amine oxides and polyethylenepolyamines, and adducts of these compounds with ethylene oxide and/or propylene oxide are also included in the examples thereof.

In the present invention, it is preferable to use a cationic surfactant in which the number of nitrogen atoms contained in one molecule is large as the emulsifier (A), in order to satisfy the performances required in an emulsion for blending containing it, such as mixability with aggregate and easiness of controlling the decomposition time. Such a cationic surfactant is highly polar and therefore has high water holding property, so that the asphalt emulsion containing the surfactant exhibits a high stability when mixed with aggregate. It is preferable particularly in the preparation of an emulsion for blending to use such a cationic surfactant.

The reasons therefor are as follows. Aggregate to be used for paving a road has negative charge. Therefore, when an asphalt emulsion comprising a cationic surfactant comes into contact with the surface of the aggregate, the emulsified particles are electrically neutralized, by which the emulsion is broken through aggregation and the asphalt adheres to the surface of the aggregate. When one having a small number of nitrogens contained in one molecule, such as monoamine salts, diamine salts and quaternary ammonium salts, is used in the preparation of an emulsion for blending, the stability of the thus-obtained emulsion becomes unsatisfactory and the break of the emulsion based on the above mechanism may occur in a short time, in some cases. That is, it is afraid to be caused such the situation that the decomposition time is too short.

On the other hand, polyamine salts wherein the number of nitrogens contained in one molecule is 3 or more exhibit high affinity with water which constitutes the continuous phase of an asphalt emulsion, and it is not decomposed, i.e., the break of the emulsion does not occur, in a short time, even when it comes into contact with aggregate. Further, after the emulsion is decomposed and the polyamine salt adheres to aggregate, firm adherent property is exhibited since it electrically bonds with the aggregate. Accordingly, such polyamines are desirable as the surfactant to be used in the preparation of an emulsion for blending.

In the first to ninth embodiments of the present invention, it is particularly preferable to use an aliphatic amine represented by the above formula (1) together with a polyphenolic compound (B) or the like. An asphalt emulsion containing such an aliphatic amine and a polyphenolic compound (B) is extremely excellent in mixability with aggregate and the paving executed by the use of such the emulsion has extremely high strength and endurance. Although the species of the surfactants to be used is limited to components (A-1) in the tenth to eighteenth embodiments of the present invention, the aliphatic amine represented by the above formula (1) is one of components (A-1).

Other preferable examples of the cationic surfactants include aminated lignins and imidazolines having a hydrocarbon group having 7 or more, preferably 8 or more, still more preferably 8 to 22 carbon atoms. An asphalt emulsion containing such a cationic surfactant and a polyphenolic compound (B) is extremely excellent in mixability with aggregate and the paving executed by the use of such the emulsion has extremely high strength and endurance. Although the species of the surfactants to be used is limited to components (A-1) in the tenth to eighteenth embodiments of the present invention, the aminated lignin and the imidazoline having a hydrocarbon group having 7 or more carbon atoms are each one of components (A-1).

Among aminated lignins, those represented by the following formula (2) are particularly preferable, while among imidazolines having a hydrocarbon group having 7 or more carbon atoms, those represented by the following formulae (3) and (4) are particularly preferable:

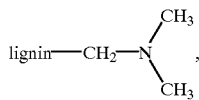

(2)

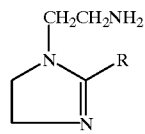

(3)

wherein R represents a hydrocarbon group having 7 to 22, preferably 8 to 22, carbon atoms, and

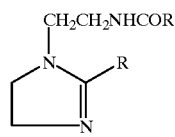

(4)

wherein R represents a hydrocarbon group having 7 to 22, preferably 8 to 22, carbon atoms.

The cationic surfactants other than quaternary ammonium salts are used in the form of a salt thereof with a monobasic acid such as hydrochloric acid, acetic acid, nitric acid and sulfamic acid.

Examples of the amphoteric surfactants include those of a betaine type and an amidobetaine type, and phospholipids such as phosphatidylcholine, phosphatidylserine and phosphatidylethanolamine. Among them, betaines having a hydrocarbon group having 7 or more, preferably 8 or more, still more preferably 8 to 22, carbon atoms, and amidobetaines having a hydrocarbon group having 7 or more, preferably 8 or more, still more preferably 8 to 22, carbon atoms are desirable for the same reasons as those in the case of the cationic surfactants.

Among betaines having a hydrocarbon group having 7 or more carbon atoms, those represented by the following formula (5) are particularly preferable, while among amidobetaines having a hydrocarbon group having 7 or more carbon atoms, those represented by the following formula (6) are particularly preferable:

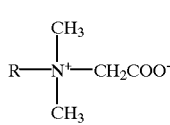

(5)

wherein R represents a hydrocarbon group having 7 to 22, preferably 8 to 22, carbon atoms, and

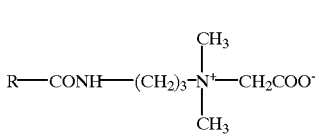

(6)

wherein R represents a hydrocarbon group having 7 to 22, preferably 8 to 22, carbon atoms.

Examples of the nonionic surfactants include polyethylene glycol type surfactants such as adducts of higher alcohols with ethylene oxide, adducts of alkylphenols with ethylene oxide, adducts of fatty acids with ethylene oxide, adducts of polyhydric alcohol/fatty acid esters with ethylene oxide, adducts of higher alkylamines with ethylene oxide, adducts of fatty acid amides with ethylene oxide, adducts of fats and oils with ethylene oxide and adducts of polypropylene glycol with ethylene oxide; and polyhydric alcohol type surfactants such as glycerol/fatty acid esters, pentaerythritol/fatty acid esters, sorbitol/fatty acid esters, sorbitan/fatty acid esters, sucrose/fatty acid esters, alkyl ethers of polyhydric alcohols and fatty acid amides of alkanolamines.

It is desirable to use, as the emulsifier (A), one of which the HLB is 10 or above.

In the asphalt emulsion according to the present invention, component (A) or (A-1) is used in an amount of preferably 0.01 to 10 parts by weight, still more preferably 0.05 to 3.0 parts by weight, per 100 parts by weight of the total of asphalt and water.

In the polyphenolic compound (B) to be used in the present invention, compounds having hydroxyl groups on an aromatic ring(s) such as benzene ring wherein the number of such the hydroxyl groups is two or more per one molecule (which include monocyclic compounds and polycyclic compounds); substance prepared by the oxidative polymerization of such the compounds; and the like are included. Specific examples thereof include hydrolyzable tannins such as gallnut tannin, nutgalls tannin, sumach tannin, fatsia tannin, valonia tannin, chestnut tannin, myrobalan tannin, oak tannin, divi-divi tannin and algarobia tannin; condensed tannins such as gambir tannin, quebracho tannin, mimosa tannin, mangrove tannin, hemlock tannin, Spruce tannin, Burma cutch tannin, oak bark tannin and persimmon tannin; tannin compounds such as rice tannin, cascarote tannin, acacia tannin, depside, Chinese tannin, Turkish tannin, hamamelitannin, quebric acid and ellargic acid tannin; purified tannic acids originating from these tannin compounds; polyhydric phenols such as catechol, resorcinol, hydroquinone, pyrogallol, phloroglucinol and gallic acid; gallic acid derivatives; and lignins. In the additive composition for asphalt emulsion of the first embodiment of the present invention and an asphalt emulsion and the like using it, it is preferable to use as component (B) at least one member selected from the group consisting of tannin compounds, tannic acid, catechol, resorcinol, hydroquinone, pyrogallol, gallic acid and gallic acid derivatives, and it is still more preferably to use at least one member selected from the group consisting of tannin compounds, tannic acid and pyrogallol. While, in the composition for asphalt emulsion of the tenth embodiment of the present invention and an asphalt emulsion and the like using it, it is preferable to use as component (B) at least one member selected from the group consisting of tannin compounds, tannic acid, catechol, resorcinol, hydroquinone, pyrogallol, gallic acid and gallic acid derivatives.

In the present invention, as component (B), use can be made them each alone, or after mixing two or more of them. The use amount thereof is preferably 0.01 to 10.0 parts by weight, still more preferably 0.1 to 3.0 parts by weight per 100 parts by weight of the total of asphalt and water in the asphalt emulsion of the second embodiment of the present invention or the like, and is preferably 0.01 to 5.0 parts by weight, still more preferably 0.03 to 4.0 parts by weight, particularly preferably 0.05 to 3.0 parts by weight per 100 parts by weight of the total of asphalt and water in the asphalt emulsion of the eleventh embodiment of the present invention or the like.

In the present invention, it is preferable to use, as the polyphenolic compound (B), one wherein the percentage of absolute area of the components having a weight-average molecular weight, on chromatogram, of 2800 or above is 10% or below in the molecular weight distribution as determined by gel permeation chromatography (GPC) effected after acetylation thereof. Such a polyphenolic compound can be obtained by fractionating a polyphenolic compound by column chromatography.

The method of acetylating a polyphenolic compound and determining the molecular weight (distribution) of the obtained derivative by GPC is as follows.

[Acetylation Process]

A sample is acetylated according to the description of Kobunshi Bunseki Handbook (Handbook for the analysis of polymers) (pp. 783–784, published by Kinokuniya Shoten, 1995). That is, 2 g of a sufficiently dried sample is put in a 50-ml Erlenmeyer flask fitted with a ground-in glass stopper, and 10 ml of pyridine and 10 ml of acetic anhydride are added thereto while cooling with ice to dissolve the sample. At the point of time when the generation of heat is discontinued, the flask is stopped up and thereafter is allowed to stand at a room temperature (20° C.) in a dark place for 12 hours. Then, the contents of the flask are poured into a 200-ml beaker holding 100 ml of ice-water to precipitate an acetylate. After the precipitate is recovered by filtration and washed with ice-water, it is dried with nitrogen, and then dried in a vacuum at ordinary temperatures. Thus, an acetylate is obtained.

[Conditions of Determination by GPC]

sample size: 0.5%, 100 ml column: G4000HXL+G2000HXL (a product of Tosoh Corporation)

eluent: 50 mM $CH_3COOH$/THF flow rate: 1.0 ml/min column temp.: 40° detector: R1 ref. material: polystyrene.

As the polyphenolic compound (B), from the standpoint of adherence thereof to aggregate, those wherein the percentage of absolute area of the components having a weight-average molecular weight, on chromatogram, of 2800 or above is 10% or below, still more 5% or below, particularly 1% or below, in the molecular weight distribution after acetylation thereof, are preferable. Further, those wherein the percentage of absolute area of the components having a weight-average molecular weight, on chromatogram, of 1500 to 2600 is 90% or above, particularly 95% or above, in the molecular weight distribution after acetylation, are preferable. Furthermore, those wherein the ratio (Mw/Mn) of the weight-average molecular weight (Mw) to the number-average molecular weight (Mn) is 1.4 or below, still more 1.3 or below, particularly 1.2 or below, in the molecular weight distribution after acetylation, are preferable.

The effects brought about by the addition of the polyphenolic compound (B) to an asphalt emulsion are resulted from such the chemical structure like a surfactant that such the compound has simultaneously a hydrophobic skeleton and a hydrophilic group (hydroxyl group). By virtue of such the chemical structure, the polyphenolic compound (B) adheres to the surface of an asphalt particle through wetting and peneration functions thereof and forms a protective layer around the asphalt particle by forming a hydrated structure due to many hydroxyl groups. Thus, the asphalt particles are stabilized in the emulsion, so that the emulsion does not cause rapid decomposition even when mixed with aggregate. Further, aggregate on a wet state has hydroxyl groups on the surface and, therefore, these hydroxyl groups form hydrogen bondings together with the hydroxyl groups of the polyphenolic compound (B). It is presumed that such hydrogen bondings together with the physical adsorption of asphalt itself to aggregate make asphalt adhere to aggregate firmly.

In the present invention, at least one member selected from the group consisting of anionic polymeric dispersants, hydroxycarboxylic acids and water-soluble salts of hydroxycarboxylic acids is used as component (C).

Examples of the anionic polymeric dispersants to be used in the present invention include naphthalenesulfonic acid/formaldehyde condensate, melaminesulfonic acid/formaldehyde condensate, phenolsulfonic acid/formaldehyde condensate, polycarboxylic acid copolymers and water-soluble salts thereof, kraut lignins obtained from needle-leaved trees and broad-leaved trees, ligninsulfonic acids and water-soluble salts thereof, and starches such as tapioca starch. Among them, ligninsulfonic acids and water-soluble salts, such as Na salts, Ca salts, Mg salts, Zn salts and Al salts, of ligninsulfonic acids are preferable.

In the present invention, a hydroxycarboxylic acid or a water-soluble salt thereof may be used as component (C) instead of or together with these anionic polymeric dispersant. Examples of the hydroxycarboxylic acids include gluconic acid, glucoheptonic acid, arabonic acid, malic acid and citric acid. While, its water-soluble salt means its sodium salt or the like. In the present invention, sodium gluconate is particularly preferably used.

In, e.g., the asphalt emulsion of the second embodiment of the present invention, component (C) is used in such an amount that the total of this component (C) and component (D) which will be described below is preferably 0.01 to 10 parts by weight, still more preferably 0.01 to 2.0 parts by weight, particularly preferably 0.05 to 2.0 parts by weight per 100 parts by weight of the total of asphalt and water. In this case, the amount of component (C) to be used is also preferably 0.01 to 10 parts by weight, still more preferably 0.01 to 2.0 parts by weight, particularly preferably 0.05 to 2.0 parts by weight per 100 parts by weight of the total of asphalt and water. On the other hand, in, e.g., the asphalt emulsion of the eleventh embodiment of the present invention, component (C) is used in an amount of preferably 0.01 to 10 parts by weight, still more preferably 0.01 to 2.0 parts by weight, particularly preferably 0.05 to 2.0 parts by weight per 100 parts by weight of the total of asphalt and water. When the amount of component (C) or the total amount of components (C) and (D) is too large, the storage stability of the asphalt emulsion will be poor in some cases. Component (C) is a substance which has hitherto been used as a dispersant for inorganic materials or cement, and it is effective in improving the mixability and dispersibility of powdered stone, calcium carbonate and cement which are used as clayey aggregates or fillers.

Component (D) in the present invention is at least one member selected from the group consisting of saccharides, sugar alcohols and polyhydric alcohols.

Examples of the saccharides to be used in the present invention include monosaccharides and disaccharides such as glucose, maltose, fructose, galactose, saccharose and isomerized saccharides; oligosaccharides such as dextrin; and polysaccharides such as dextran. Further, molasses containing them are also included in the saccharides of the present invention. An example of the sugar alcohol includes sorbitol. The polyhydric alcohol may be any one so long as it has two or more hydroxyl groups in the molecule and is dissolved in water, and examples thereof include polyethylene glycol, glycerol, ethylene glycol, propylene glycol, polyglycerol and diethylene glycol. When polyethylene glycol is used in the present invention, those having an average molecular weight of 200 to 5000 are preferred.

As component (D) which is used in the additive composition for asphalt emulsion of the first embodiment of the present invention and in an asphalt emulsion or a composition for emulsification containing it, at least one member selected from the group consisting of sorbitol, glycerol and polyethylene glycols having an average molecular weight of 200 to 5000 is preferred, at least one member selected from the group consisting of sorbitol, glycerol and polyethylene glycols having an average molecular weight of 200 to 800 is still more preferred, and glycerol is particularly preferred. On the other hand, as component (D) which is used in the additive composition for asphalt emulsion of the tenth embodiment of the present invention and in an asphalt emulsion or a composition for emulsification containing it, at least one member selected from the group consisting of maltose, saccharose, sorbitol, glycerol and polyethylene glycols having an average molecular weight of 200 to 5000 is preferred, at least one member selected from the group consisting of sorbitol, polyethylene glycols having an average molecular weight of 200 to 5000 and glycerol is still more preferred, and a polyethylene glycol having an average molecular weight of 200 to 800 is most preferred.

In, e.g., the asphalt emulsion of the second embodiment of the present invention, component (D) is used in such an amount that the total of this component (D) and the above-described component (C) is preferably 0.01 to 10 parts by weight, still more preferably 0.01 to 2.0 parts by weight, particularly preferably 0.05 to 2.0 parts by weight per 100 parts by weight of the total of asphalt and water. In this case, the amount of component (D) to be used is preferably 0.01 to 10 parts by weight, still more preferably 0.05 to 2.0 parts by weight per 100 parts by weight of the total of asphalt and water. On the other hand, in, e.g., the asphalt emulsion of the eleventh embodiment of the present invention, component (D) is used in an amount of preferably 0.01 to 10 parts by weight, still more preferably 0.05 to 2.0 parts by weight per 100 parts by weight of the total of asphalt and water. When the amount of component (D) or the total amount of components (C) and (D) is too large, the adherence of asphalt to aggregate will be poor, so that the strength and endurance of the paving executed by the use of such the asphalt emulsion will be lowered. In the paving composition, component (D) can hold water which serves as lubricant and therefore is effective in enhancing the lubricity among solid particles (aggregate). In other words, component (D) contributes in the enhancement of the flowability in the paving compositions of the third and twelfth embodiments of the present invention. Accordingly, when component (D) exists, the mixabilty of the asphalt emulsion with aggregate can be secured and therefore the workability of the above paving composition can be kept, even under severe conditions of high atmospheric temperature.

The additive composition for asphalt emulsion and the composition for asphalt emulsion of the present invention are used in the preparation of an asphalt emulsion. The additive composition for asphalt emulsion of the first embodiment of the present invention comprises components (B), (C) and (D) as essential components and optionally the emulsifier (A). The additive composition for asphalt emulsion is used together with a suitable emulsifier, water and asphalt to give an asphalt emulsion, independent of whether it contains the emulsifier (A) or not. Alternatively, when the additive composition for asphalt emulsion contains the emulsifier (A), an emulsifier may not be further added in the preparation of an asphalt emulsion. On the other hand, the composition for asphalt emulsion of the tenth embodiment of the present invention comprises components (A-1) and (B) as essential components and optionally component (C) and (D). This composition for asphalt emulsion is used together with water and asphalt to give an asphalt emulsion. Of course, another emulsifier may also be added.

The concepts of the additive composition for asphalt emulsion and the composition for asphalt emulsion of the present invention include kits wherein the constituents thereof are packaged respectively, and the like.

In the preparation of asphalt emulsions, it is preferable to use the compositions for emulsification of the fifth and fourteenth embodiments of the present invention, though it is acceptable that the necessary components among components (A) [or (A-1)] are respectively dissolved in water to give aqueous solutions, and asphalt is emulsified by the use of such the aqueous solutions, suitably. In these compositions for emulsification, all of the components except asphalt among the constituents of an asphalt emulsion can be contained and, therefore, asphalt emulsions can easily be prepared by the use of these compositions. When these compositions for emulsification contain a cationic surfactant such as amine-type ones, the compositions for emulsification may contain, in some cases, a monobasic acid which makes it to be an acid-type one.

The composition for emulsification can be prepared by adding the components to water successively or by preliminary preparing a mixture of the components to be added to water and adding the mixture to water. When a cationic surfactant other than quaternary ammonium salt type surfactants and/or an amphoteric surfactant is used as the emusifier (A) [or (A-1)], it is preferable that the compositions for emulsification are prepared by the processes of the sixth, seventh, fifteenth and sixteenth embodiment of the present invention as described above.

Still more preferable examples of the processes for preparing the composition for emulsification of the present invention include a process [procedure (1)] which comprises (1) preparing an aqueous solution of component (B), (2) adding a monobasic acid such as hydrochloric acid to the aqueous solution of component (B), (3) adding a separately prepared mixture comprising component (D) and a cationic surfactant and/or an amphoteric surfactant [component (A) or (A-1)] to the aqueous solution prepared in step (2), and (4) adding a separately prepared aqueous solution of component (C) to the aqueous solution prepared in step (3);

and a process [procedure (2)] which comprises (1) preparing an aqueous solution containing components (B) and (C), (2) adding a monobasic acid such as hydrochloric acid to the aqueous solution prepared in step (1), and (3) adding a separately prepared mixture comprising component (D) and a cationic surfactant and/or an amphoteric surfactant [component (A) or (A-1)] to the aqueous solution prepared in step (2). The temperatures when these processes are conducted are preferably 60 to 80° C. Further, the composition for emulsification preferably has a solid content of 40 to 60% by weight.

When the composition for emulsification is prepared by such the process, a homogeneous and one solution type composition can be obtained. In the above procedures (1) and (2), item (2) may be dispensed, depending upon the kind of the surfactant used. Although the particularly proper selection between the above procedures (1) and (2) is unnecessary, the employment of the procedure (1) is preferable in the case where a solid surfactant which can be converted into liquid by changing the conditions such as temperature and concentration, for example, an adduct of a solid amine with an alkylene oxide, is used as the emulsifier (A) [or (A-1)]. While, the employment of the procedure (2) is preferable in the case where the emulsifier (A) [or (A-1)] is a solid one which is difficult of mixing with water, for example, a tallow-alkyl dialkylenetriamine. When a non-ionic surfactant, an anionic surfactant or a quaternary ammonium salt type surfactant is used as the emulsifier (A) [or (A-1)] instead of or together with the cationic surfactant and/or the anionic surfactant, it may be added in any step in the procedures (1) and (2).

Further, it is preferable to prepare a composition for emulsification comprising components (A), (B) and (C) by a process comprising step 1 of adding component (A) to an aqueous solution of component (B) to prepare an aqueous solution and step 2 of adding an aqueous solution of component (C) to the obtained aqueous solution, or a process comprising step 1 of adding a monobasic acid to an aqueous solution of component (B) to prepare an aqueous acidic solution, step 2 of adding component (A) to the aqueous acidic solution to prepare an aqueous solution, and step 3 of adding an aqueous solution of component (C) to the obtained aqueous solution.

Furthermore, it is preferable to prepare a composition for emulsification comprising components (A), (B) and (D) by a process comprising the step of adding a mixture of component (A) and component (D) to an aqueous solution of component (B) to prepare an aqueous solution, or a process comprising step 1 of adding a monobasic acid to an aqueous solution of component (B) to prepare an aqueous acidic solution and step 2 of adding a mixture of component (A) and component (D) to the aqueous acidic solution to prepare an aqueous solution.

Examples of the asphalts to be used in the present invention include petroleum straight asphalt, semi-blown asphalt, cut-back asphalt and natural asphalt. One of them or a mixture of two or more of them is used in the preparation of an asphalt emulsion of the present invention.

The asphalt emulsion can be prepared by emulsifying asphalt in one of the aqueous solutions respectively containing necessary components among the above components (A) [or (A-1)], (B), (C) and (D) or an aqueous solution (for example, the composition for emulsification according to the present invention) containing all of such the necessary components. Some of the components are used not in the form of an aqueous solution thereof but as such. For example, the polyphenolic compound (B) may be preliminarily dissolved in an aqueous solution of the emulsifier (A) or may be added in the form as it is to an asphalt emulsion prepared by emulsifying asphalt in an aqueous solution of the emulsifier (A). Although the asphalt emulsion can be prepared only with the water resulting from the aqueous solutions in some cases, the asphalt emulsion may be prepared by further adding water at need. In the asphalt emulsion of the second embodiment of the present invention, the weight ratio of asphalt to water (asphalt/water) is preferably 35 to 90/65 to 10. In the asphalt emulsion of the eleventh embodiment of the present invention, the weight ratio of asphalt to water (asphalt/water) is preferably 40 to 80/60 to 20.

The asphalt emulsion of the present invention may further contain a natural rubber, a synthetic rubber such as a styrene-butadiene copolymer, a styrene-isoprene copolymer and a chloroprene copolymer; a polymer such as polyethylene and ethylene-vinyl acetate copolymer; a petroleum resin, a thermoplastic resin or the like. In some case, these components may be preliminarily mixed with asphalt. Such mixtures are called modified asphalts. The asphalt emulsion may further contain also, e.g., inorganic and organic fillers such as calcium carbonate, slaked lime, cement and activated carbon; petroleum softening agents; vegetable oil softening agents, various plasticizers, sulfur and the like.

The paving of a road or the like is conducted by the use of a paving composition comprising the asphalt emulsion and aggregate.

The concept of aggregate to be used in the present invention includes natural aggregates such as fillers, crushed stone, crushed gravel, gravel, sand and reclaimed aggregates; and artificial aggregates such as calcined bauxite, special hard slags obtained as by-products in smelting metals or non-metals, fused alumina and various abrasive materials. The concept of aggregate further includes also tint aggregates which are white aggregates prepared by firing natural aggregates or artificial aggregates; and colored aggregates prepared by adding inorganic pigments thereto.

The filler has a concept which refers a powdered stone of limestone or igneous rock, cement, slaked lime, fly ash or the like.

The crushed stone is a material produced by crushing raw rock mechanically and, if necessary, subjecting the obtained particles to size classification. The raw rock herein is an igneous rock, a sedimentary rock or a metamorphic rock. The igneous rocks are classified into basalt, andesite, liparite, diabase, quartz porphyry, hankigan, diorite, granite and the like, based on the state of deposit and silica content. The concept of sedimentary rocks includes tuff, agglomerate, conglomerate, shale, limestone and the like, while that of metamorphic rocks includes mylonite, hornfels, gneiss, crystalline schist and the like.

The crushed gravel is a material produced by crushing cobble stone or gravel, while the concept of gravel includes river gravel, pit gravel, beach gravel and the like.

The sands are classified into natural sands, artificial sands, screenings, special sands and the like. The natural sands are classified into river sand, pit sand, beach sand and the like, based on the place where it was collected. The artificial sand is a material produced by crushing rock or cobble stone, while the screenings refers to fine material having a particle diameter of 2.36 mm or below which is obtained in the production of crushed stone or crushed gravel. The concept of special sand includes silica sand, water-crushed blast-furnace slag, clinker ash and the like.

The concept of reclaimed aggregate includes reclaimed aggregate of asphalt concrete produced by the mechanical crushing or thermal cracking of material originating in asphalt concrete pavement, and reclaimed aggregate of cement concrete produced by the mechanical crushing of material originating in cement concrete pavement. To these reclaimed aggregates, an auxiliary material or an additive for reclamation is added at need.

The ferrous slag is one prepared by crushing a slag produced in the production process of iron and steel. It is classified into blast-furnace slag obtained from a blast furnace by smelting in the production process of pig iron, and steel-making slag produced in the production process of steel. In general, hydraulic ferrous slag of controlled grading, ferrous slag of controlled grading, crusher-run ferrous slag or the like is used for paving a road.

In the present invention, the weight ratio of aggregate to asphalt emulsion (aggregate/asphalt emulsion) is preferably 75 to 95/25 to 5.

In the preparation of the paving composition which is used for, e.g., paving a road and which comprises the asphalt emulsion and aggregate, at least one member selected from the group consisting of water-soluble inorganic salts such as ammonium chloride, potassium chloride, sodium chloride, calcium chloride, aluminum chloride and iron chloride; water-soluble polymers such as polyvinyl alcohol, gelatin, hydroxyethylcellulose, methylcellulose and cationic starch; and water-soluble natural rubbers may further be added, depending upon the use and object of the composition, the method of execution or the like. Further, water may further be added when water is unsufficiet by the use of only the water resulting from the asphalt emulsion.

As described above in detail, according to the present invention, an asphalt emulsion satisfying all of the properties required in the market, for example, storage stability, mixability with aggregate and anti-foaming properties of the emulsion itself, adherence of the products of breaking of the emulsion to aggregate, stripping resistance of the construction executed by the use of the emulsion and so on, can be provided. Particularly when an asphalt emulsion wherein a specific emulsifier is used is employed, there are excellent further in mixability with cement and easiness of controlling the decomposition time of the emulsion itself, adherence of the products of breaking of the emulsion to crushed stone, and strength and endurance of the construction (such as paving of a road) executed by the use of the emulsion.

Such the asphalt emulsion can effectively be used in the uses such as the paving of a road, the construction of railway, cement asphalt mortar, corrosion prevention, rust prevention, waterproofing, bonding, agricultural land reclamation and so on.

EXAMPLES

The present invention will be illustrated in more detail by referring to the following Examples, though it should not be considered that the Examples limit the scope of the present invention.

Examples 1 to 9 and Comparative Examples 10 to 17

[Preparation of Asphalt Emulsion]

An asphalt having a penetration of 80 to 100 was heated to 145° C. to melt.

Separately, components which would be added to an asphalt emulsion listed in Table 1 or 2 were dissolved in warm water at 45° C. to prepare an aqueous solution. 40 parts by weight of the thus-prepared aqueous solution for emulsification of 45° C. and 60 parts by weight of a molten asphalt of 145° C. were simultaneously passed through a barrel type homogenizer to prepare an asphalt emulsion. Only when an amine type surfactant (i.e., tallow-alkyl propylenediamine) was used, the pH of the aqueous solution for emulsification was adjusted to 2 by using hydrochloric acid.

With respect to the asphalt emulsions thus prepared, the storage stability, mixability with cement and mixability with aggregate, and the adherence of the products of breaking thereof to crushed stone were examined. The results are given in Tables 1 and 2. The testing methods are those as will be described below.

[Testing Methods]

(1) Storage stability of emulsion

The storage stability of an emulsion was examined according to JIS K 2208 (1980). Specifically, the experiment was conducted as follow.

1) 250 ml of a sample is weighed into a cylinder having an inner diameter of 32 mm and a height of 340 mm and fitted with two sampling ports on the side; and the cylinder is stopped up and allowed to stand as such at room temperatures for 5 days.

2) About 50 g of the sample is taken out through the upper sampling port A without shaking the cylinder, followed by accurate weighing.

3) The sample present between the sampling ports A and B is discharged through the lower sampling port B.

4) The sample remaining at the bottom of the cylinder is stirred; and then about 50 g of the sample is taken out through the sampling port B, followed by accurate weighing.

5) The samples taken out in steps 2) and 4) are each heated for 20 to 30 minutes.

6) After the disappearance of water has been confirmed, the samples are further heated at 160° C. for one minute and thereafter cooled to room temperature by allowing to stand, 7) The percentage by mass (referred to as evaporation residue) of the residue (g) of the evaporation based on the sample (g) is determined.

8) The difference between the evaporation residues of both samples is calculated.

In Tables, together with the values determined, the cases where it meets the standard requirement, i.e., those where the difference between the numerical values of the evaporation residues is 5% or below, are shown by the symbol ○, and those where it does not meet are shown by the symbol X.

(2) Mixability with cement

The mixability of an emulsion with cement was examined according to ASTM D244 33-37. Specifically, the experiment was conducted as follows.

1) A sample is diluted with distilled water to such an extent that the residue of distillation or 3-hour evaporation at 163° C. is 55%.

2) 50 g of cement passing through a No.80 sieve (180 μm) is put in a dish or saucepan made of iron.

3) 100 ml of the diluted sample is added to the cement; and immediately thereafter, the obtained mixture is stirred at 60 rpm by the use of a stirring rod.

4) One minute after the initiation of the stirring, 150 ml of distilled water is added; and the obtained mixture is stirred for 3 minutes. Steps 3) and 4) are conducted at 25° C. throughout.

5) The obtained mixture is poured onto a No. 14 sieve (1.40 mm). The mixture adhering to the vessel is also poured thereonto completely by washing the vessel with the filtrate repeatedly.

6) The cake on the sieve is sufficiently washed with distilled water.

7) The cake on the sieve is heated at 163° C.

8) The weight (g) at the point of time when the change in weight by heating becomes 0.1 g or below is regarded as the residue (%) of emulsion breaking in the cement mixture test.

In Tables, together with the values determined, the cases where it meets the standard requirement, i.e., those where it is 2% or below, are shown by the symbol ○, and those where it does not meet are shown by the symbol X.

(3) Adherence to crushed stone

Dry crushed stones having a diameter of 5 to 13 mm were dipped in water for one minute. Immediately after being taken out of the water, the crushed stones were dipped in an emulsion for one minute. The crushed stones taken out of the emulsion were placed in order on a glass plate and aged as such at room temperatures for 24 hours. After aging, the resulting crushed stones were immersed in warm water at 80° C. for one hour. One hour after they were taken out of the warm water, the ratios of areas of the asphalt films covered on the surfaces of the crushed stones were evaluated by the naked eye and the ratios were regarded as the ratios (%) of adhered areas. Herein, the number of the crushed stones used in one test was ten and the kind of the stones was limestone.

In Tables, the average values of the ratios (%) of asphalt-adhered areas of ten crushed stones and the results of evaluation made according to the following criteria are given.

X: the ratio of asphalt-adhered area is less than 50%,

Δ: the ratio of asphalt-adhered area is 50% or above but below 70%,

○: the ratio of asphalt-adhered area is 70% or above but below 90%, and

⊚: the ratio of asphalt-adhered area is 90% or above.

(4) Mixability with aggregate 60 g of additive water was added to 2200 g of dry aggregate which meets a particle size distribution of aggregate for dense grade mixture as described in Outlines for Paving a Road, i.e., has a particle size distribution which will be described in the following Table A. The obtained mixture was agitated, and then 240 g of an asphalt emulsion was added thereto. The mixture thus obtained was kneaded for 2 minutes, and the mixability of the asphalt emulsion with the aggregate was evaluated according to the following criteria. The testing temperature (temperature at evaluation) was 25° C., and in mixing, a mixer (capacity: 5 l) for preparation of asphalt mixture mfd. by World Test (K.K.) was used.

The results of evaluation according to the following criteria are given in Tables.

X: the emulsion was decomposed (i.e., the emulsion was broken) during kneading,

Δ: they were uniformly mixed, but immediately thereafter the emulsion was decomposed, ○: they were uniformly mixed, but the working life of the emulsion (the time until the breaking of the emulsion) was short, and ⊚: they were uniformly mixed, and the emulsion had a sufficiently long working life and a good workability.

TABLE A

| | Max. particle size mm | 20 |
|---|---|---|
| Percentage | 26.5 mm | 100 |
| by mass of | 19 mm | 95~100 |
| undersize | 13.2 mm | 75~90 |
| % | 4.75 mm | 45~65 |
| | 2.36 mm | 35~50 |
| | 600 μm | 18~30 |
| | 300 μm | 10~21 |
| | 150 μm | 6~16 |
| | 75 μm | 4~8 |

TABLE 1

| Additives (pts. by wt.) | Ex. | | | | | | | | |
|---|---|---|---|---|---|---|---|---|---|
| | 1 | 2 | 3 | 4 | 5 | 6 | 7 | 6 | 9 |
| Component (A) | | | | | | | | | |
| alkyl(C₁₈)tri-methyl ammonium chloride | 0.5 | 0.5 | | | | | 0.5 | | |
| tallow-alkyl propylene-diamine* | | | 0.5 | | | 0.2 | | 0.5 | 0.5 |
| polyoxy-ethylene (PEO = 50) nonylphenyl ether | | | | 0.3 | 0.3 | | | | |
| aminated lignin | | | | 0.3 | | 0.4 | | | 0.2 |
| sodium dodecyl-benzenesulfate | | | | | 0.3 | | | | |
| Component (B) | | | | | | | | | |
| pyrogallol | 0.3 | | | | | | 0.1 | | |
| tanninc acid (reagent) | | 0.3 | | | | 0.1 | 0.3 | | 0.1 |
| quebracho tannin | | | 0.3 | 0.3 | 0.3 | 0.1 | | 0.1 | |
| Component (C) | | | | | | | | | |
| calcium ligninsulfonate | 0.2 | 0.2 | | 0.1 | | | 0.1 | 0.2 | 0.1 |
| sodium gluconate | | | 0.2 | | 0.1 | | | | 0.1 |
| Component (D) | | | | | | | | | |
| glycerol | | | | | | | 0.1 | | 0.1 |
| polyethylene glycol (Mw = 600) | | | | | | | | 0.1 | |
| sorbitol | | | | | | 0.2 | | | 0.1 |
| Total Amt.** (pts. by wt.) of components (A) to (D) | 1.0 | 1.0 | 1.0 | 1.0 | 1.0 | 1.0 | 1.0 | 1.0 | 1.0 |
| Results of examinations | | | | | | | | | |
| storage stability of emulsion | ○ 1.9 | ○ 1.9 | ○ 1.1 | ○ 1.7 | ○ 1.4 | ○ 0.2 | ○ 1.5 | ○ 0.6 | ○ 0.7 |
| mixability with cement | ○ 0.9 | ○ 0.9 | ○ 1.2 | ○ 0.8 | ○ 0.1 | ○ 0.8 | ○ 0.5 | ○ 1.2 | ○ 0.9 |
| adherence to crushed stone | ⊚ 100 | ⊚ 100 | ⊚ 100 | ⊚ 100 | ⊚ 95 | ⊚ 100 | ⊚ 95 | ⊚ 100 | ⊚ 95 |
| mixability with aggregate | ○ | ○ | ○ | ○ | ○ | ○ | ⊚ | ⊚ | ⊚ | notes)
*tallow alkyl-NHCH₂CH₂CH₂NH₂
**this is an amount on the basis of the sum total of asphalt and water being 100 parts by weight.

TABLE 2

| Additives (pts. by wt.) | Comp. Ex. | | | | | | | |
|---|---|---|---|---|---|---|---|---|
| | 10 | 11 | 12 | 13 | 14 | 15 | 16 | 17 |
| Component (A) | | | | | | | | |
| alkyl(C₁₈)trimethylammonium | 1.5 | | | | | 0.5 | | |

TABLE 2-continued

| Additives | Comp. Ex. | | | | | | | |
|---|---|---|---|---|---|---|---|---|
| (pts. by wt.) | 10 | 11 | 12 | 13 | 14 | 15 | 16 | 17 |
| chloride | | | | | | | | |
| tallow-alkyl propylenediamine* | | 1.5 | 0.4 | | | | 0.5 | 0.3 |
| polyoxyethylene(PEO = 50) nonylphenyl ether | | | 0.3 | | | | | 0.2 |
| aminated lignin | | | | 0.3 | 1.0 | | | |
| sodium dodeoylbenzenesulfate | | | | | | 0.5 | | |
| Component (B) | | | | | | | | |
| pyrogallol | | | | | | | | |
| tanninc acid (reagent) | | | | | | 0.5 | | 0.3 |
| quebracho tannin | | | | | | | 0.5 | 0.2 |
| Component (C) | | | | | | | | |
| calcium ligninsulfonate | | | | | 0.5 | | | |
| sodium gluconate | | | | | | | | |
| Component (D) | | | | | | | | |
| glycerol | | | | | | | | |
| polyethylene glycol (Mw = 600) | | | 0.5 | | | | | |
| sorbitol | | | | | | | | |
| Total Amt.** (pts. by wt.) of components (A) to (D) | 1.5 | 1.5 | 1.5 | 1.0 | 1.0 | 1.0 | 1.0 | 1.0 |
| Results of examinations | | | | | | | | |
| storage stability of emulsion | X 10.2 | ◯ 1.4 | ◯ 0.9 | X 8.6 | ◯ 3.0 | X 7.9 | ◯ 3.1 | ◯ 4.6 |
| mixability with cement | ◯ 1.0 | X 8.9 | X 6.7 | X 6.9 | ◯ 1.2 | X 3.0 | X 10.1 | X 7.8 |
| adherence to crushed stone | X 45 | X 45 | X 30 | Δ 60 | X 10 | ◯ 80 | ◯ 80 | X 50 |
| mixability with aggregate | X | X | X | X | X | X | X | X | notes)
*tallow alkyl-NHCH$_2$CH$_2$CH$_2$NH$_2$
**this is an amount on the basis of the sum total of asphalt and water being 100 parts by weight.

As is apparent from Tables 1 and 2, Examples of the present invention were excellent in mixability with cement and mixability with aggriate, and with respect to also the adherence of asphalt to crushed stone which has an influence on the endurance of paving a road, they exhibited excellent performances. The above tests were made on a dense grade mixture system having a small amount of the additive water. However, it is considered that excellent mixability was attained in Examples due to the synergistic action of components (A) to (D), even under such severe conditions. With respect to particularly the mixability with aggregate, the effects were excellent when all of components (A) to (D) were used (Examples 7 to 9).

On the other hand, the systems (Comparative Examples 10, 11 and 13) containing only component (A) (emulsifiers), and the systems (Comparative Examples 12 and 14 to 17) containing only two components, i.e., component (A) and, component (B) (polyphenolic compounds), (C) (anionic polymeric dispersants) or (D) (saccharides), were inferior to Examples in mixability with aggregate. Further, Comparative Examples 11 to 13 and 15 to 17 among Comparative Examples described above were apparently inferior to Examples in the evaluation result of "mixability with cement" which serves as an indication of the mixability of asphalt emulsion with aggregate (particularly the finely powdered or clayey one). Furthermore, in Comparative Examples 10 to 12, 14 and 17, only such the result that they were inferior to Examples also in adherence to crushed stone could obtained.

As described above, Examples of the present invention are those capable of satisfying all of the performances including stability of emulsion, mixability with cement, adherence to crushed stone and mixability with aggregate.

Examples 101 to 132 and Comparative Examples 101 to 134

[Preparation of Asphalt Emulsion]

Asphalts having penetrations of 60 to 80, 80 to 100 and 150 to 200 respectively were each heated to 155° C. to melt.

Separately, a surfactant listed in any of Tables 3 to 12 and calcium chloride were dissolved in warm water at 55° C., and then the components other than the surfactant listed in any of Tables 3 to 12 were added thereto and dissolved therein. 40 parts by weight of the thus-prepared aqueous solution for emulsification of 55° C. and 60 parts by weight of a molten asphalt of 155° C. were simultaneously passed through a colloid mill to prepare an asphalt emulsion. The amount (unit: part by weight) of each component per 100 parts by weight of this asphalt emulsion was given in Tables 3 to 12. Further, the calcium chloride was used in an amount of 0.15 part by weight per 100 parts by weight of asphalt emulsion. When a cationic surfactant was used, the pH of the aqueous solution for emulsification was adjusted to 2 by using hydrochloric acid.

With respect to the asphalt emulsions thus prepared, the storage stability, mixability with cement, mixability with aggregate and decomposition time, and the adherence of the products of breaking thereof to crushed stone were examined. The results are given in Tables 3 to 12. The testing methods are those as will be described below.

[Testing Methods]

(1) Storage stability of emulsion

The storage stability of an emulsion was examined according to ASTM D244 29-32. Specifically, the experiment was conducted as follow.

1) 500 ml of a sample is weighed into a cylinder having an outer diameter of 50 mm and a capacity of 500 ml; and the cylinder is stopped up and allowed to stand as such at room temperatures for 5 days.

2) About 55 ml of the sample is pipetted from the top of the cylinder without shaking the cylinder, and about 50 g thereof is put in a beaker having a capacity of 1000 ml.

3) The sample is heated in an oven at 163±28° C. for 2 hours to evaporate the water contained in the sample.

4) The weight (g) of the residue of the evaporation is determined, and the percentage by mass (referred as to evaporation residue) of the residue of the evaporation (g) based on the sample (g) is calculated.

5) About 390 ml of the sample is pipetted from the top of the cylinder.

6) The sample remaining at the bottom of the cylinder is sufficiently stirred, and thereafter about 50 g of the sample is taken out of the cylinder and puts in a beaker having a capacity of 1000 ml.

7) The operations of 3) and 4) are conducted.

8) The difference between the evaporation residues of both samples is calculated.

In Tables, together with the values determined, the cases where it meets the standard requirement, i.e., those where the difference between the numerical values of the evaporation residues is 5% or below, are shown by the symbol ◯, and those where it does not meet are shown by the symbol X.

(2) Adherence to crushed stone

The examination and evaluation were conducted in the same manner as those in Examples 1 to 9.

(3) Mixability with aggregate

The examination and evaluation were conducted in the same manner as those in Examples 1 to 9. The dry aggregate used herein which meets a particle size distribution of aggregate for dense grade mixture had such the composition that No.6 crushed stone was 34% by weight, No.7 crushed stone was 21% by weight, screenings was 17% by weight, coarse sand was 12% by weight, fine sand was 10% by weight and powdered stone was 6% by weight.

(4) Mixability with cement

The examination and evaluation were conducted in the same manner as those in Examples 1 to 9.

(5) Decomposition time of emulsion

Additive water and an asphalt emulsion were added to aggregate under the same conditions as those employed in the above test on mixability with aggregate, followed by mixing. After the completion of the mixing, the obtained mixture was allowed to stand under the conditions of 25° C. and relative humidity of 30%. The state of the mixture was observed with the naked eye and evaluated according to the following criteria.

X: the emulsion was decomposed in the standing time of below 10 minutes,

Δ: the emulsion was decomposed in the standing time of 10 minutes or above but below 60 minutes, or that of 10 hours or above, ○: the emulsion was decomposed in the standing time of 60 minutes or above but below 2 hours, or that of 6 hours or above but below 10 hours, and ⊚: the emulsion was decomposed in the standing time of 2 hours or above but below 6 hours.

Further, with the use of the above asphalt emulsions, the asphalt emulsion composite materials were prepared as that which will be described below, and the radial compression strength test was conducted by using them. The results are given in Tables 3 to 12. The testing method are those as will be described below.

[Preparation Method of Asphalt Emulsion Composite Material]

10 parts by weight of an asphalt emulsion was mixed with 90 parts by weight of an aggregate having such a composition that No. 6 crushed stone was 34% by weight, No.7 crushed stone was 21% by weight, screenings was 17% by weight, coarse sand was 12% by weight, fine sand was 10% by weight and powdered stone was 6% by weight, to prepare a mixture. 1250 g of the mixture thus obtained was packed into a mold for measuring Martial stability. The mixture was tamped 75 times, the mold was reversed and the mixture was further tamped 75 times to prepare an asphalt emulsion composite material.

[Testing Method for Radial Compression Strength]

The asphalt emulsion composite material prepared by the above method was taken out of the mold. After aging at 60° C. for 3 days, it was immersed in warm water at 60° C. for 24 hours. The composite material was taken out of the warm water and cooled to 20° C., and thereafter the radial compression strength was measured with a load measuring device.

TABLE 3

| | Ex. | | | | | | |
|---|---|---|---|---|---|---|---|
| | 101 | 102 | 103 | 104 | 105 | 106 | 107 |
| Component A-1 | | | | | | | |
| tallow-dipropylenetriamine* | 0.5 | | | | | | |

TABLE 3-continued

| | Ex. | | | | | | |
|---|---|---|---|---|---|---|---|
| | 101 | 102 | 103 | 104 | 105 | 106 | 107 |
| tallow-tripropylenetetramine* | | 0.5 | | | | | |
| tallow-tetra-propylenepentamine* | | | 0.5 | | | | |
| tallow-penta-propylenehexamine* | | | | 0.5 | | | |
| adduct of tallow-dipropylene triamine with EO (n = 15)* | | | | | 0.6 | | |
| adduct of tallow-tripropylene tetramine with EO (n = 10)* | | | | | | 0.6 | |
| adduct of tallow-tripropylene-tetramine with PO (n = 10)* | | | | | | | 0.6 |
| adduct of tallow-tetrapro-pylenepentamine with PO (n = 7)* | | | | | | | |
| tallow-alkanoyldiethylene-triamine** | | | | | | | |
| aminated lignin | | | | | | | |
| stearylimidazoline | | | | | | | |
| laurylbetanine | | | | | | | |
| Component B | | | | | | | |
| gallnut tannic acid | 0.3 | | | | | | |
| quebracho tannic acid | | 0.3 | | | | | |
| catechol | | | 0.5 | | | | |
| resorcinol | | | | 0.5 | | | |
| hydroquinone | | | | | 0.5 | | |
| pyrogallol | | | | | | 0.4 | |
| gallic acid | | | | | | | 0.3 |
| methyl gallate | | | | | | | |
| Components C and D | | | | | | | |
| calcium ligninsulfonate | | | | | | | |
| sodium gluconate | | | | | | | |
| polyethylene glycol (MW = 400) | | | | | | | |
| glycerol | | | | | | | |
| sorbitol | | | | | | | |
| Penetration of asphalt (1/10 mm) | | | | | | | |
| 60–80 | ○ | | | ○ | | ○ | |
| 80–100 | | ○ | | | ○ | | |
| 150–200 | | | ○ | | | | ○ |
| Results of examinations | | | | | | | |
| radial compression strength (kgf/cm²) | 4.2 | 4.2 | 3.5 | 3.8 | 3.6 | 4.0 | 4.2 |
| storage stability of emulsion | ○ | ○ | ○ | ○ | ○ | ○ | ○ |
| | 2.5 | 1.5 | 1.7 | 1.7 | 2.5 | 1.7 | 1.9 |
| adherence to crushed stone | ⊚ | ⊚ | ⊚ | ⊚ | ⊚ | ⊚ | ⊚ |
| mixability with aggregate | ○ | ○ | ○ | ○ | ○ | ○ | ○ |
| mixability with cement | ○ | ○ | ○ | ○ | ○ | ○ | ○ |
| | 1.1 | 1.2 | 1.2 | 1.1 | 1.0 | 1.0 | 1.1 |
| decompn. Time of emulsion | ○ | ○ | ○ | ○ | ○ | ○ | ○ | notes:
*a compound wherein a tallow alkyl group is bonded mainly to the terminal nitrogen atom (the same applies also to the following Tables).
**the tallow-alkanoyl group is bonded mainly to the terminal nitrogen atom (the same applies also to the following Tables).

TABLE 4

| Additives (pts. by wt.) | Ex. 106 | Ex. 109 | Ex. 110 | Ex. 111 | Ex. 112 | Ex. 113 | Ex. 114 |
|---|---|---|---|---|---|---|---|
| Component A-1 | | | | | | | |
| tallow-dipropylenetriamine | | | | | | 0.5 | |
| tallow-tripropylenetetramine | | | | | | | 0.2 |
| tallow-tetra-propylenepentamine | | | | | | | |
| tallow-penta-propylenehexamine | | | | | | | |
| adduct of tallow-dipropylene-triamine with EO (n = 15) | | | | | | | |
| adduct of tallow-tripropylene tetramine with PO (n = 10) | | | | | | 0.2 | |
| adduct of tallow-tripropylene-tetramine with EO (n = 10) | | | | | | | 0.3 |
| adduct of tallow-tetrapro-pylenepentanine with PO (n = 7) | 0.6 | | | | | | |
| tallow-alkanoyldiethylene-triamine | | 0.5 | | | | | |
| aminated lignin | | | 1.0 | | | | |
| stearylimidazoline | | | | 0.6 | | | |
| laurylbetanine | | | | | 0.7 | | |
| Component B | | | | | | | |
| gallnut tannic acid | | | 0.1 | 0.2 | 0.1 | 0.2 | 0.1 |
| quebracho tannic acid | | 0.2 | 0.2 | | | | |
| catechol | | | 0.1 | 0.2 | | | |
| resorcinol | | | | | 0.3 | | |
| hydroquinone | | | | | | 0.2 | |
| pyrogallol | | | | | | | 0.3 |
| gallic acid | | | | | | | |
| methyl gallate | 0.5 | | | | | | |
| Components C and D | | | | | | | |
| calcium ligninsulfonate | | | | | | | |
| sodium gluconate | | | | | | | |
| polyethylene glycol (MW = 400) | | | | | | | |
| glycerol | | | | | | | |
| sorbitol | | | | | | | |
| Penetration of asphalt (1/10 mm) | | | | | | | |
| 60–80 | | | | ○ | | | ○ |
| 80–100 | ○ | ○ | | | ○ | | |
| 150–200 | | | ○ | | | ○ | |
| Results of examinations | | | | | | | |
| radial compression strength (kgf/cm²) | 3.7 | 3.9 | 4.0 | 4.1 | 3.7 | 4.1 | 4.2 |
| storage stability of emulsion | ○ | ○ | ○ | ○ | ○ | ○ | ○ |
| | 3.0 | 3.2 | 3.1 | 3.5 | 2.5 | 1.8 | 2.0 |
| adherence to crushed stone | ◎ | ◎ | ◎ | ◎ | ◎ | ◎ | ◎ |
| mixability with aggregate | ○ | ○ | ◎ | ○ | ○ | ○ | ○ |
| mixability with cement | ○ | ○ | ○ | ○ | ○ | ○ | ○ |
| | 1.2 | 1.1 | 1.0 | 1.2 | 1.2 | 1.1 | 1.2 |
| decompn. time of emulsion | ○ | ○ | ○ | ○ | ○ | ○ | ○ |

TABLE 5

| Additives (pts. by wt.) | Ex. 115 | Ex. 116 | Ex. 117 | Ex. 118 | Ex. 119 | Ex. 120 | Ex. 121 |
|---|---|---|---|---|---|---|---|
| Component A-1 | | | | | | | |
| tallow-dipropylenetriamine | | | | | | | |
| tallow-tripropylenetetramine | | | | | | 0.4 | 0.3 |
| tallow-tetra-propylenepentamine | 0.2 | | | | | | |
| tallow-penta-propylenehexamine | | | 0.2 | | | | |
| adduct of tallow-dipropylene-triamine with EO (n = 15) | | | | | | | |
| adduct of tallow-tripropylene-tetramine with EO (n = 10) | 0.2 | | 0.3 | 0.3 | | | 0.3 |
| adduct of tallow-tripropylene-tetramine with PO (n = 10) | | | | | | | |
| adduct of tallow-tetrapro-pylenepentanine with PO (n = 7) | | 0.3 | | | | | |
| tallow-alkanoyldiethylene-triamine | | | | | | | |
| aminated lignin | | 0.2 | | | | 0.3 | 0.1 |
| stearylimidazoline | | | | | 0.2 | | |
| laurylbetanine | | | | 0.1 | | | 0.1 |
| Component B | | | | | | | |
| gallnut tannic acid | 0.2 | 0.2 | | | | | |
| quebracho tannic acid | | | 0.2 | 0.2 | 0.2 | 0.3 | 0.1 |
| catechol | | | | | | | |
| resorcinol | | | | | 0.2 | | |
| hydroquinone | | | | 0.1 | | | |
| pyrogallol | | | | | | 0.1 | |
| gallic acid | 0.1 | | | | | | |
| methyl gallate | | 0.3 | | | | | 0.3 |
| Components C and D | | | | | | | |
| calcium ligninsulfonate | | | | | | | |
| sodium gluconate | | | | | | | |
| polyethylene glycol (MW = 400) | | | | | | | |
| glycerol | | | | | | | |
| sorbitol | | | | | | | |
| Penetration of asphalt (1/10 mm) | | | | | | | |
| 60–80 | | ○ | | | ○ | | |
| 80–100 | ○ | | ○ | | | ○ | |
| 150–200 | | | | ○ | | | ○ |
| Results of examinations | | | | | | | |
| radial compression strength (kgf/cm²) | 4.3 | 4.0 | 4.2 | 4.1 | 3.8 | 4.3 | 4.1 |
| storage stability of emulsion | ○ | ○ | ○ | ○ | ○ | ○ | ○ |
| | 2.0 | 3.5 | 1.5 | 1.5 | 2.7 | 2.5 | 1.8 |
| adherence to crushed stone | ◎ | ◎ | ◎ | ◎ | ◎ | ◎ | ◎ |
| mixability with aggregate | ○ | ○ | ◎ | ○ | ○ | ◎ | ◎ |
| mixability with cement | ○ | ○ | ○ | ○ | ○ | ○ | ○ |
| | 1.4 | 1.1 | 0.9 | 1.2 | 1.2 | 1.0 | 1.0 |
| decompn. time of emulsion | ○ | ○ | ○ | ○ | ○ | ○ | ○ |

TABLE 6

| Additives (pts. by wt.) | Ex. 122 | Ex. 123 | Ex. 124 | Ex. 125 | Ex. 126 | Ex. 127 | Ex. 128 |
|---|---|---|---|---|---|---|---|
| Component A-1 | | | | | | | |
| tallow-dipropylenetriamine | | | 0.5 | | | | |
| tallow-tripropylenetetramine | | | | 0.4 | | | |
| tallow-tetra-propylenepentamine | | | | | | | |
| tallow-penta-propylenehexamine | | | | | | | |
| adduct of tallow-dipropylene triamine with EO (n = 15) | | | | | 0.5 | | |
| adduct of tallow-tripropylene-tetramine with EO (n = 10) | | 0.4 | | | | | 0.3 |
| adduct of tallow-tripropylene-tetramine with PO (n = 10) | | | | | | 0.5 | |
| adduct of tallow-tetrapro-pylenepentanine with PO (n = 7) | | | | | | | |
| tallow-alkanoyldiethylene-triamine | 0.3 | | | | | | |
| animated lignin | 0.3 | | | | | | |
| stearylimidazoline | | | | | | | |
| laurylbetanine | | | | | | | 0.1 |
| Component B | | | | | | | |
| gallnut tannic acid | | | | | 0.3 | | |
| quebracho tannic acid | | 0.2 | | | | | 0.3 |
| catechol | | | 0.1 | | | | |
| resorcinol | | | | 0.1 | | | |
| hydroquinone | | | | | 0.2 | | |
| pyrogallol | 0.2 | | 0.3 | | | | |
| gallic acid | 0.1 | 0.2 | 0.2 | | 0.1 | | |
| methyl gallate | | | | | | | |
| Components C and D | | | | | | | |
| calcium ligninsulfonate | | 0.2 | | | | | 0.1 |
| sodium gluconate | | | 0.2 | | | | |
| polyethylene glycol (MW = 400) | | | | 0.1 | | | 0.1 |
| glycerol | | | | | | 0.3 | |
| sorbitol | | | | | | 0.3 | |
| Penetration of asphalt (1/10 mm) | | | | | | | |
| 60–80 | | | ○ | | ○ | | |
| 80–100 | ○ | | | ○ | | ○ | |
| 150–200 | | | | | ○ | | ○ |
| Results of examinations | | | | | | | |
| radial compression strength (kgf/cm$^2$) | 3.7 | 4.2 | 3.9 | 3.8 | 4.2 | 3.9 | 4.1 |
| storage stability of emulsion | ○ 3.9 | ○ 1.5 | ○ 3.8 | ○ 1.9 | ○ 1.5 | ○ 2.4 | ○ 1.4 |
| adherence to crushed stone | ◉ | ◉ | ◉ | ◉ | ◉ | ◉ | ◉ |
| mixability with aggregate | ◉ | ○ | ○ | ◉ | ◉ | ◉ | ◉ |
| mixability with cement | ○ 1.0 | ○ 0.2 | ○ 0.4 | ○ 0.9 | ○ 1.1 | ○ 1.2 | ○ 0.1 |
| decompn. time of emulsion | ○ | ○ | ○ | ◉ | ◉ | ◉ | ◉ |

TABLE 7

| Additives (pts. by wt.) | Ex. 129 | Ex. 130 | Ex. 131 | Ex. 132 | Ex. 133 | Ex. 134 |
|---|---|---|---|---|---|---|
| Component A-1 | | | | | | |
| tallow-dipropylenetriamine | | | | | 0.2 | 0.2 |
| tallow-tripropylenetetramine | | 0.3 | 0.2 | | | |
| tallow-tetrapropylenepentamine | | | | | | |
| tallow-pentapropylenehexamine | | | | | | |
| adduct of tallow-dipropylene-triamine with EO (n = 15) | | | | | | |
| adduct of tallow-tripropylene-tetramine with EO (n = 10) | 0.2 | | | 0.2 | 0.3 | |
| adduct of tallow-tripropylene-tetramine with PO (n = 10) | | | | | | |
| adduct of tallow-tetrapro-pylenepentamine with PO (n = 7) | | | | | | |
| tallow-alkanoyldiethylene-triamine | | | | 0.2 | | |
| aminated lignin | 0.2 | | 0.2 | | | |
| stearylimidazoline | | 0.2 | | | | |
| laurylbetanine | | | | | | |
| Component B | | | | | | |
| gallnut tannic acid | | | 0.3 | | | |
| quebracho tannic acid | 0.2 | 0.2 | | 0.2 | 0.3 | 0.3 |
| catechol | | | | | | |
| resorcinol | | | | | | |
| hydroquinone | | | | | | |
| pyrogallol | 0.1 | | | | | |
| gallic acid | | 0.1 | | | | |
| methyl gallate | | | | | | |
| Components C and D | | | | | | |
| calcium ligninsulfonate | | 0.1 | 0.1 | | 0.2 | 0.2 |
| sodium gluconate | 0.1 | | | 0.1 | | |
| polyethylene glycol (MW = 400) | | | 0.2 | 0.1 | 0.1 | 0.2 |
| glycerol | 0.2 | | | | | |
| sorbitol | | 0.2 | | | | |
| Penetration of asphalt (1/10 mm) | | | | | | |
| 60–80 | ○ | | | | | |
| 80–100 | | ○ | | ○ | ○ | ○ |
| 150–200 | | | ○ | | | |
| Results of examinations | | | | | | |
| radial compression strength (kgf/cm$^2$) | 4.3 | 4.3 | 4.0 | 3.9 | 4.1 | 4.0 |
| storage stability of emulsion | ○ 1.2 | ○ 2.0 | ○ 2.2 | ○ 2.5 | ○ 1.8 | ○ 1.7 |
| adherence to crushed stone | ◉ | ◉ | ◉ | ◉ | ◉ | ◉ |
| mixability with aggregate | ◉ | ◉ | ◉ | ◉ | ◉ | ◉ |
| mixability with cement | ○ 0.2 | ○ 0.2 | ○ 0.3 | ○ 0.2 | ○ 0.3 | ○ 0.2 |
| decompn. time of emulsion | ◉ | ◉ | ◉ | ◉ | ◉ | ◉ |

TABLE 8

| Additives (pts. by wt.) | Comp. Ex. 101 | Comp. Ex. 102 | Comp. Ex. 103 | Comp. Ex. 104 | Comp. Ex. 105 | Comp. Ex. 106 | Comp. Ex. 107 |
|---|---|---|---|---|---|---|---|
| Component A-1 | | | | | | | |
| tallow-dipropylenetriamine | 0.5 | | | | | | |
| tallow-tripropylenetetramine | | 0.5 | | | | | |
| tallow-tetra- | | | 0.5 | | | | |

TABLE 8-continued

| Additives (pts. by wt.) | Comp. Ex. 101 | 102 | 103 | 104 | 105 | 106 | 107 |
|---|---|---|---|---|---|---|---|
| propylenepentamine | | | | | | | |
| tallow-pentapropylenehexamine | | | 0.5 | | | | |
| adduct of tallow-dipropylene triamine with EO (n = 15) | | | | 0.6 | | | |
| adduct of tallow-tripropylene-tetramine with EO (n = 10) | | | | | | 0.6 | |
| adduct of tallow-tripropylene-tetramine with PO (n = 10) | | | | | | | 0.6 |
| adduct of tallow-tetrapro-pylenepentanine with PO (n = 7) | | | | | | | |
| tallow-alkanoyldiethylene-triamine | | | | | | | |
| animated lignin | | | | | | | |
| stearylimidazoline | | | | | | | |
| laurylbetanine | | | | | | | |
| Component B | | | | | | | |
| gallnut tannic acid | | | | | | | |
| quebracho tannic acid | | | | | | | |
| catechol | | | | | | | |
| resorcinol | | | | | | | |
| hydroquinone | | | | | | | |
| pyrogallol | | | | | | | |
| gallic acid | | | | | | | |
| methyl gallate | | | | | | | |
| Components C and D | | | | | | | |
| calcium ligninsulfonate | | | 0.2 | | | | |
| sodium gluconate | | | | | | 0.1 | |
| polyethylene glycol (MW = 400) | | | | | 0.1 | | |
| glycerol | | | | | | | |
| sorbitol | | | | | 0.1 | | |
| Penetration of asphalt (1/10 mm) | | | | | | | |
| 60–80 | ○ | | | ○ | | | ○ |
| 80–100 | | ○ | | | ○ | | |
| 150–200 | | | ○ | | | ○ | |
| Results of examinations | | | | | | | |
| radial compression strength (kgf/cm²) | 1.8 | 1.7 | 1.8 | 1.6 | 1.9 | 1.7 | 1.9 |
| storage stability of emulsion | ○ | ○ | ○ | X | X | ○ | X |
| | 2.6 | 3.4 | 4.7 | 6.5 | 5.2 | 4.0 | 5.4 |
| adherence to crushed stone | Δ | Δ | Δ | X | X | X | X |
| mixability with aggregate | Δ | Δ | Δ | Δ | Δ | Δ | Δ |
| mixability with cement | X | X | X | X | X | X | X |
| | 8.5 | 8.7 | 3.9 | 9.1 | 6.5 | 4.7 | 5.8 |
| decompn. time of emulsion | Δ | Δ | Δ | Δ | Δ | Δ | Δ |

TABLE 9

| Additives (pts. by wt.) | Comp. Ex. 108 | 109 | 110 | 111 | 112 | 113 | 114 |
|---|---|---|---|---|---|---|---|
| Component A-1 | | | | | | | |
| tallow-dipropylenetriamine | | | | | | | |
| tallow-tripropylenetetramine | | | | | | | |
| tallow-tetra-propylenepentamine | | | | | | | |
| tallow-penta-propylenehexamine | | | | | | | |
| adduct of tallow-dipropylene triamine with EO (n = 15) | | | | | | | |
| adduct of tallow-tripropylene-tetramine with EO (n = 10) | | | | | | 0.2 | |
| adduct of tallow-tripropylene-tetramine with PO (n = 10) | | | | | | | 0.3 |
| adduct of tallow-tetrapro-pylenepentanine with PO (n = 7) | 0.6 | | | | | | |
| tallow-alkanoyldiethylene-triamine | | 0.5 | | | | | |
| animated lignin | | | 1.0 | | | | |
| stearylimidazoline | | | | 0.8 | | | 0.2 |
| laurylbetanine | | | | | 0.7 | 0.2 | |
| Component B | | | | | | | |
| gallnut tannic acid | | | | | | | |
| quebracho tannic acid | | | | | | | |
| catechol | | | | | | | |
| resorcinol | | | | | | | |
| hydroquinone | | | | | | | |
| pyrogallol | | | | | | | |
| gallic acid | | | | | | | |
| methyl gallate | | | | | | | |
| Components C and D | | | | | | | |
| calcium ligninsulfonate | | | | | | 0.2 | |
| sodium gluconate | | | | | | | |
| polyethylene glycol (MW = 400) | | | | | | | |
| glycerol | 0.3 | | | | | | 0.2 |
| sorbitol | | | | | | | |
| Penetration of asphalt (1/10 mm) | | | | | | | |
| 60–80 | | | | ○ | | | ○ |
| 80–100 | ○ | ○ | | | ○ | | |
| 150–200 | | | ○ | | | ○ | |
| Results of examinations | | | | | | | |
| radial compression strength (kgf/cm²) | 1.8 | 1.7 | 1.7 | 1.9 | 1.7 | 1.6 | 1.8 |
| storage stability of emulsion | X | X | ○ | ○ | ○ | ○ | ○ |
| | 5.3 | 6.3 | 4.0 | 4.2 | 3.7 | 3.0 | 3.1 |
| adherence to crushed stone | X | Δ | Δ | X | X | X | X |
| mixability with aggregate | Δ | Δ | Δ | Δ | X | Δ | Δ |
| mixability with cement | X | X | X | X | X | X | X |
| | 4.6 | 4.3 | 4.5 | 8.1 | 8.2 | 3.6 | 5.0 |
| decompn. time of emulsion | Δ | Δ | Δ | Δ | X | X | Δ |

TABLE 10

| Additives (pts. by wt.) | Comp. Ex. 115 | 116 | 117 | 118 | 119 | 120 |
|---|---|---|---|---|---|---|
| Component A-1 | | | | | | |
| tallow-dipropylenetriamine | | | | | | |
| tallow-tripropylenetetramine | | | | | | |
| tallow-tetrapropylenepentamine | | 0.6 | | | | |
| tallow-pentapropylenehexamine | | | | | | |
| adduct of tallow-dipropylenetriamine with EO (n = 15) | | | 0.5 | | | |
| adduct of tallow-tripropylenetetramine with EO (n = 10) | 0.3 | | | 0.6 | | |
| adduct of tallow-tripropylenetetramine with PO (n = 10) | | | | | | |
| adduct of tallow-tetrapropylenepentamine with PO (n = 7) | | | | | 0.5 | |
| tallow-alkanoyldiethylenetriamine | | | | | | 0.2 |
| aminated lignin | 0.2 | | | | | 0.2 |
| stearylimidazoline | | | | | | |
| laurylbetanine | | | | | | |
| Component B | | | | | | |
| gallnut tannic acid | | | | | | |
| quebracho tannic acid | | | | | | |
| catechol | | | | | | |
| resorcinol | | | | | | |
| hydroquinone | | | | | | |
| pyrogallol | | | | | | |
| gallic acid | | | | | | |
| methyl gallate | | | | | | |
| Components C and D | | | | | | |
| calcium ligninsulfonate | 0.1 | | | | | |
| sodium gluconate | | | | | | |
| polyethylene glycol (MW = 400) | 0.1 | | | | | |
| glycerol | | | | | | |
| sorbitol | | | | | | |
| Penetration of asphalt (1/10 mm) | | | | | | |
| 60–80 | | | ○ | | | |
| 80–100 | | ○ | | ○ | | ○ |
| 150–200 | | | ○ | | ○ | |
| Results of examinations | | | | | | |
| radial compression strength (kgf/cm²) | 1.7 | 1.8 | 1.7 | 1.8 | 1.7 | 1.9 |
| storage stability of emulsion | ○ | ○ | X | ○ | X | ○ |
| | 2.9 | 4.4 | 5.4 | 4.8 | 5.7 | 4.6 |
| adherence to crushed stone | X | Δ | X | X | X | Δ |
| mixability with aggregate | Δ | Δ | Δ | Δ | Δ | Δ |
| mixability with cement | X | X | X | X | X | X |
| | 3.7 | 7.9 | 7.0 | 4.1 | 4.3 | 3.9 |
| decompn. time of emulsion | Δ | Δ | Δ | Δ | Δ | Δ |

TABLE 11

| Additives (pts. by wt.) | Comp. Ex. 121 | 122 | 123 | 124 | 125 | 126 | 127 |
|---|---|---|---|---|---|---|---|
| Component A-1 | | | | | | | |
| tallow-propylenediamine | 0.5 | | | | | | |
| adduct of tallow-propylenediamine with EO (n = 3) | | 0.5 | | | | | |
| tallow-monoamine* | | | 0.5 | | | | |
| adduct of tallow-monoamine with PO (n = 7)** | | | | 0.5 | | | |
| stearyl-trimethylammonium chloride | | | | | 0.6 | | |
| polyoxyethylene nonylphenyl ethyl (n = 85) | | | | | | 1.0 | |
| sodium dodecylbenzenesulfate | | | | | | | |
| sodium oleate | | | | | | | 0.6 |
| Component B | | | | | | | |
| gallnut tannic acid | | 0.3 | | | | | |
| quebracho tannic acid | | | | | | 0.5 | |
| catechol | | | | | | | |
| resorcinol | | | | | | | |
| hydroquinone | | | | | | | |
| pyrogallol | | | | 0.3 | | | |
| gallic acid | | | | | | | |
| methyl gallate | | | | | | | |
| Components C and D | | | | | | | |
| calcium ligninsulfonate | | | | | 0.2 | | |
| sodium gluconate | | | | | | | |
| polyethylene glycol (MW = 400) | | | | | | | 0.3 |
| glycerol | | | | | | | |
| sorbitol | | | | | | | |
| Penetration of asphalt (1/10 mm) | | | | | | | |
| 60–80 | ○ | | | ○ | | | ○ |
| 80–100 | | ○ | | | ○ | | |
| 150–200 | | | ○ | | | ○ | |
| Results of examinations | | | | | | | |
| radial compression strength (kgf/cm²) | 1.8 | 2.8 | 2.9 | 1.7 | 2.0 | 1.5 | 1.8 |
| storage stability of emulsion | ○ | ○ | X | X | X | ○ | ○ |
| | 4.5 | 3.5 | 5.4 | 6.5 | 6.4 | 3.3 | 4.5 |
| adherence to crushed stone | X | ○ | ○ | Δ | X | Δ | X |
| mixability with aggregate | X | Δ | Δ | X | X | ◎ | X |
| mixability with cement | X | ○ | X | ○ | ○ | ○ | X |
| | 9.3 | 1.4 | 2.8 | 1.6 | 0.3 | 0.1 | 3.7 |
| decompn. time of emulsion | X | X | X | X | Δ | Δ | X | notes)
*it refers a mono(tallow-alkyl)amine (the same applies also to the following Table).
**it refers an adduct of a mono(tallow-alkyl)amine with propylene oxide (the same applies also to the following Table).

TABLE 12

| Additives (pts. by wt.) | Comp. Ex. 128 | 129 | 130 | Ex. 135 | 136 | 137 | 139 |
|---|---|---|---|---|---|---|---|
| Component A-1 | | | | | | | |
| tallow-propylenediamine | | 0.3 | | | | | |
| adduct of tallow-propylenediamine with EO (n = 3) | | | | | 0.2 | | |
| tallow-monoamine | | 0.3 | | | | | 0.2 |

TABLE 12-continued

| | Comp. Ex. | | | Ex. | | | |
|---|---|---|---|---|---|---|---|
| Additives (pts. by wt.) | 128 | 129 | 130 | 135 | 136 | 137 | 139 |
| adduct of tallow-monoamine with PO (n = 7) | | | | 0.4 | | | |
| stearyl-trimethylammonium chloride | | | | | 0.4 | 0.3 | |
| polyoxyethylene nonylphenyl ethyl (n = 85) | | | 1.0 | | | | 0.5 |
| sodium dodecylbenzenesulfate | | | | | 0.2 | | 0.2 |
| sodium oleate | 0.6 | | | | | 0.5 | |
| Component B | | | | | | | |
| gallnut tannic acid | | | 0.2 | | | | |
| quebracho tannic acid | | | | 0.3 | | 0.3 | 0.2 |
| catechol | | | 0.2 | | | | |
| resorcinol | | | | | | | |
| hydroquinone | | | | | | | |
| pyrogallol | | | | | | | 0.2 |
| gallic acid | | | | | 0.3 | | |
| methyl gallate | | | | | | 0.1 | |
| Components C and D | | | | | | | |
| calcium ligninsulfonate | | | | 0.1 | | | 0.1 |
| sodium gluconate | | | | | 0.1 | | |
| polyethylene glycol (MW = 400) | 0.3 | | | 0.1 | | 0.2 | 0.1 |
| glycerol | | | | | | | |
| sorbitol | | | | | 0.2 | | 0.1 |
| Penetration of asphalt (1/10 mm) | | | | | | | |
| 60–80 | | | | ◯ | | ◯ | |
| 80–100 | ◯ | | ◯ | | ◯ | | ◯ |
| 150–200 | | ◯ | | | ◯ | | |
| Results of examinations | | | | | | | |
| radial compression strength (kgf/cm²) | 1.7 | 1.7 | 2.2 | 3.0 | 2.8 | 3.0 | 2.7 |
| storage stability of emulsion | X | ◯ | ◯ | ◯ | ◯ | ◯ | ◯ |
| | 5.5 | 3.6 | 3.2 | 3.4 | 4.3 | 3.2 | 2.2 |
| adherence to crushed stone | X | X | Δ | ◯ | ◯ | ◯ | ◯ |
| mixability with aggregate | X | X | ◯ | Δ | Δ | Δ | ◯ |
| mixability with cement | X | X | X | ◯ | ◯ | ◯ | ◯ |
| | 9.5 | 8.6 | 3.2 | 1.6 | 1.8 | 1.8 | 1.5 |
| decompn. time of emulsion | X | X | Δ | Δ | Δ | Δ | Δ |

As shown in Tables 3 to 12, Examples of the present invention are superior to Comparative Examples in various performances evaluated.

It will be apparent that the same can be varied in many processes, although the present invention has been thus illustrated. Such variations should not be regarded as deviated from the attempt and scope of the present invention. And it is considered that all of such the modifications apparent to any person skilled in the art are included in the scope of the following claims.

We claim:

1. An additive composition for an asphalt emulsion which comprises (B) a polyphenolic compound, and at least one member selected from the group consisting of (C) anionic polymeric dispersants, hydroxycarboxylic acids and water-soluble salts of hydroxycarboxylic acids and (D) saccharides, sugar alcohols and polyhydric alcohols.

2. The additive composition for an asphalt emulsion as described in claim 1, which further comprises (A) an emulsifier.

3. The additive composition for an asphalt emulsion as described in claim 2, wherein component (A) is at least one member selected from the group consisting of aliphatic amines represented by the following formula (1):

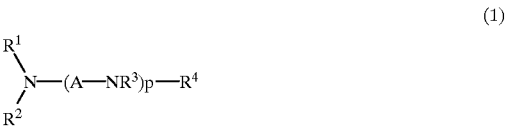

wherein $R^1$ is a hydrocarbon group or acyl group having 8 to 22 carbon atoms; $R^2$ is a hydrocarbon group having 8 to 22 carbon atoms, a hydrogen atom or a group represented by the formula: $(AO)_m$—H wherein AO represents an oxyalkylene group having 2 or 3 carbon atoms; and m represents a number of 1 to 30; $R^3$ is a hydrogen atom or a group represented by the formula: $(AO)_m$—H wherein AO and m are those as the above definitions; $R^4$ is a hydrogen atom or a group represented by the formula: $(AO)_m$—H wherein AO and m are those as the above definitions; A is an ethylene group or a propylene group; and p is an integer of 2 to 5, aminated lignins, imidazolines having a hydrocarbon group having 7 or more carbon atoms, betaines having a hydrocarbon group having 7 or more carbon atoms and amidobetaines having a hydrocarbon group having 7 or more carbon atoms.

4. The additive composition for an asphalt emulsion as described in claim 1, wherein component (B) is at least one member selected from the group consisting of tannic acid, tannin compounds, catechol, resorcinol, hydroquinone, pyrogallol, gallic acid and gallic acid derivaties.

5. The additive composition for an asphalt emulsion as described in claim 1, wherein component (C) is at least one member selected from the group consisting of ligninsulfonic acid, water-soluble salts of lignin-sulfonic acid and sodium gluconate.

6. The additive composition for an asphalt emulsion as described in claim 1, wherein component (D) is at least one member selected from the group consisting of sorbitol, polyethylene glycols having an average molecular weight of 200 to 5000, and glycerol.

7. An asphalt emulsion comprising asphalt, water, (A) an emulsifier and the additive composition for asphalt emulsion as described in claim 1.

8. The asphalt emulsion as described in claim 7, wherein component (B) is at least one member selected from the group consisting of tannic acid, tannin compounds, catechol, resorcinol, hydroquinone, pyrogallol, gallic acid and gallic acid derivaties.

9. The asphalt emulsion as described in claim 8, wherein component (C) is at least one member selected from the group consisting of ligninsulfonic acid, water-soluble salts of ligninsulfonic acid and sodium gluconate.

10. The asphalt emulsion as described in claim 8, wherein component (D) is at least one member selected from the group consisting of sorbitol, polyethylene glycols having an average molecular weight of 200 to 5000, and glycerol.

11. The asphalt emulsion as described in claim 8, wherein component (A) is at least one member selected from the group consisting of aliphatic amines represented by the following formula (1):

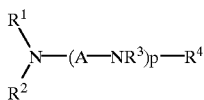

(1)

wherein $R^1$ is a hydrocarbon group or acyl group having 8 to 22 carbon atoms; $R^2$ is a hydrocarbon group having 8 to 22 carbon atoms, a hydrogen atom or a group represented by the formula: $(AO)_m$—H wherein AO represents an oxyalkylene group having 2 or 3 carbon atoms; and m represents a number of 1 to 30; $R^3$ is a hydrogen atom or a group represented by the formula: $(AO)_m$—H wherein AO and m are those as the above definitions; $R^4$ is a hydrogen atom or a group represented by the formula: $(AO)_m$—H wherein AO and m are those as the above definitions; A is an ethylene group or a propylene group; and p is an integer of 2 to 5, aminated lignins, imidazolines having a hydrocarbon group having 7 or more carbon atoms, betaines having a hydrocarbon group having 7 or more carbon atoms and amidobetaines having a hydrocarbon group having 7 or more carbon atoms.

12. The asphalt emulsion as described in claim 8, which comprises, per 100 parts by weight of the total of asphalt and water, 35 to 90 parts by weight of asphalt, 65 to 10 parts by weight of water, 0.01 to 10 parts by weight of component (B) and 0.01 to 10 parts by weight of at least one member selected from the group consisting of components (C) and (D).

13. The asphalt emulsion as described in claim 8, which comprises, per 100 parts by weight of the total of asphalt and water, 35 to 90 parts by weight of asphalt, 65 to 10 parts by weight of water, 0.01 to 10 parts by weight of component (A), 0.01 to 10 parts by weight of component (B) and 0.01 to 10 parts by weight of at least one member selected from the group consisting of components (C) and (D).

14. A paving composition comprising aggregate and the asphalt emulsion as described in claim 8.

15. A composition for an asphalt emulsion which comprises (A-1) at least one member selected from the group consisting of aliphatic amines represented by the following formula (1):

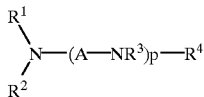

(1)

wherein $R^1$ is a hydrocarbon group or acyl group having 8 to 22 carbon atoms; $R^2$ is a hydrocarbon group having 8 to 22 carbon atoms, a hydrogen atom or a group represented by the formula: $(AO)_m$—H wherein AO represents an oxyalkylene group having 2 or 3 carbon atoms; and m represents a number of 1 to 30; $R^3$ is a hydrogen atom or a group represented by the formula: $(AO)_m$—H wherein AO and m are those as the above definitions; $R^4$ is a hydrogen atom or a group represented by the formula: $(AO)_m$—H wherein AO and m are those as the above definitions; A is an ethylene group or a propylene group; and p is an integer of 2 to 5, aminated lignins, imidazolines having a hydrocarbon group having 7 or more carbon atoms, betaines having a hydrocarbon group having 7 or more carbon atoms and amidobetaines having a hydrocarbon group having 7 or more carbon atoms; and (B) a polyphenolic compound.

16. The composition for asphalt emulsion as described in claim 15, which further comprises (C) at least one member selected from the group consisting of anionic polymeric dispersants, hydroxycarboxylic acids and water-soluble salts of hydroxycarboxylic acids, and/or, (D) at least one member selected from the group consisting of saccharides, sugar alcohols and polyhydric alcohols.

17. The composition for asphalt emulsion as described in claim 16, wherein component (C) is at least one member selected from the group consisting of ligninsulfonic acid, water-soluble salts of lignin-sulfonic acid and sodium gluconate.

18. The composition for asphalt emulsion as described in claim 17, wherein component (D) is at least one member selected from the group consisting of sorbitol, polyethylene glycols having an average molecular weight of 200 to 5000, and glycerol.

19. The composition for asphalt emulsion as described in claim 16, wherein component (B) is at least one member selected from the group consisting of tannic acid, tannin compounds, catechol, resorcinol, hydroquinone, pyrogallol, gallic acid and gallic acid derivaties.

20. An asphalt emulsion comprising asphalt, water and the composition for asphalt emulsion as described in claim 16.

21. The asphalt emulsion as described in claim 20, which comprises, per 100 parts by weight of the total of asphalt and water, 40 to 80 parts by weight of asphalt, 60 to 20 parts by weight of water, 0.01 to 10 parts by weight of component (A) and 0.01 to 5 parts by weight of component (B).

22. The asphalt emulsion as described in claim 21, which further comprises, per 100 parts by weight of the total of asphalt and water, 0.01 to 10 parts by weight of (C) at least one member selected from the group consisting of anionic polymeric dispersants, hydroxycarboxylic acids and water-soluble salts of hydroxycarboxylic acids, and 0.01 to 10 parts by weight of (D) at least one member selected from the group consisting of saccharides, sugar alcohols and polyhydric alcohols.

23. A paving composition comprising aggregate and the asphalt emulsion as described in claim 20, wherein the amount of the aggregate is 75 to 95 parts by weight and the amount of the asphalt emulsion is 25 to 5 parts by weight per 100 parts by weight of the total of the aggregate and the asphalt emulsion.

24. A composition for emulsification which comprises water, (A) an emulsifier, (B) a polyphenolic compound, and (C) at least one member selected from the group consisting of anionic polymeric dispersants, hydroxycarboxylic acids and water-soluble salts of hydroxycarboxylic acids, and/or, (D) at least one member selected from the group consisting of saccharides, sugar alcohols and polyhydric alcohols.

25. The composition for emulsification as described in claim 24, which contains component (C) and component (D).

26. The composition for emulsification as described in claim 25, which further comprises a monobasic acid.

27. A process for the preparation of the composition for emulsification as described in claim 25, which comprises step 1 of adding a mixture of component (A) and component (D) to an aqueous solution of component (B) to prepare an aqueous solution and step 2 of adding an aqueous solution of component (C) to the obtained aqueous solution.

28. The composition for emulsification as described in claim 24, which further comprises a monobasic acid.

29. A process for the preparation of the composition for emulsification as described in claim 26, which comprises step 1 of adding a monobasic acid to an aqueous solution of component (B) to prepare an aqueous acidic solution, step 2 of adding a mixture of component (A) and component (D) to the aqueous acidic solution to prepare an aqueous solution, and step 3 of adding an aqueous solution of component (C) to the obtained aqueous solution.

30. A composition for emulsification which comprises water, (A-1) at least one member selected from the group consisting of aliphatic amines represented by the following formula:

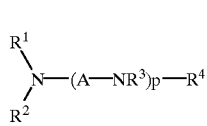

(1)

wherein $R^1$ is a hydrocarbon group or acyl group having 8 to 22 carbon atoms; $R^2$ is a hydrocarbon group having 8 to 22 carbon atoms, a hydrogen atom or a group represented by the formula: $(AO)_m$—H wherein AO represents an oxyalkylene group having 2 or 3 carbon atoms; and m represents a number of 1 to 30; $R^3$ is a hydrogen atom or a group represented by the formula: $(AO)_m$—H wherein AO and m are those as the above definitions; $R^4$ is a hydrogen atom or a group represented by the formula: $(AO)_m$—H wherein AO and m are those as the above definitions; A is an ethylene group or a propylene group; and p is an integer of 2 to 5, aminated lignins, imidazolines having a hydrocarbon group having 7 or more carbon atoms, betaines having a hydrocarbon group having 7 or more carbon atoms and amidobetaines having a hydrocarbon group having 7 or more carbon atoms; and (B) a polyphenolic compound.

31. The composition for emulsification as described in claim 30, which further comprises (C) at least one member selected from the group consisting of anionic polymeric dispersants, hydroxycarboxylic acids and water-soluble salts of hydroxycarboxylic acids and (D) at least one member selected from the group consisting of saccharides, sugar alcohols and polyhydric alcohols.

32. The composition for emulsification as described in claim 31, which further comprises a monobasic acid.

33. A process for the preparation of the composition for emulsification as described in claim 32, which comprises step 1 of adding a monobasic acid to an aqueous solution of component (B) to prepare an aqueous acidic solution, step 2 of adding a mixture of component (A-1) and component (D) to the aqueous acidic solution to prepare an aqueous solution, and step 3 of adding an aqueous solution of component (C) to the obtained aqueous solution.

34. A process for the preparation of the composition for emulsification as described in claim 31, which comprises step 1 of adding a mixture of component (A-1) and component (D) to an aqueous solution of component (B) to prepare an aqueous solution, and step 2 of adding an aqueous solution of component (C) to the obtained aqueous solution.

35. The composition for emulsification as described in claim 30, which further comprises a monobasic acid.

36. The composition for emulsification as described in claim 30, which further comprises a water-soluble inorganic salt.

37. A process for emulsifying asphalt in water, which comprises adding molten asphalt to the composition for emulsification as described in claim 24 or 32 to prepare a mixture, and then emulsifying the mixture.

* * * * *